US012717660B2

(12) United States Patent
More et al.

(10) Patent No.: US 12,717,660 B2
(45) Date of Patent: Aug. 25, 2026

(54) START AND STOP OF CONTAINERIZED APPLICATIONS

(71) Applicant: GE Precision Healthcare LLC, Wauwatosa, WI (US)

(72) Inventors: Gajanan Rameshwar More, Bangalore (IN); Venkatesh Pandi, Bangalore (IN); Sarvottam Kumar, Bangalore (IN); Ammu Sai Venkata Akhil, Bangalore (IN)

(73) Assignee: GE Precision Healthcare LLC, Waukesha, WI (US)

(*) Notice: Subject to any disclaimer, the term of this patent is extended or adjusted under 35 U.S.C. 154(b) by 649 days.

(21) Appl. No.: 18/176,205

(22) Filed: Feb. 28, 2023

(65) Prior Publication Data

US 2024/0289189 A1 Aug. 29, 2024

(51) Int. Cl.
*G06F 9/54* (2006.01)
*G06F 8/60* (2018.01)

(52) U.S. Cl.
CPC ................ *G06F 9/542* (2013.01); *G06F 8/60* (2013.01)

(58) Field of Classification Search
CPC ........ G06F 9/542; G06F 8/60; G06F 9/45558; G06F 9/485; G06F 9/5077
USPC .......................................................... 719/320
See application file for complete search history.

(56) References Cited

U.S. PATENT DOCUMENTS 10,860,444 B2 12/2020 Natanzon
10,936,444 B2 3/2021 Rhodes et al.
11,086,725 B2 8/2021 Alluboyna et al.
11,113,158 B2 9/2021 Alluboyina et al.
11,755,360 B2 9/2023 Inagaki et al.
2004/0060035 A1* 3/2004 Ustaris ...................... G06F 8/71 717/174
2006/0218290 A1* 9/2006 Lin ......................... H04L 67/61 709/229
2007/0162572 A1* 7/2007 Aloni .................... G06F 13/128 709/219
2008/0003034 A1* 1/2008 Ihara ..................... G06F 21/608 400/62

(Continued)

OTHER PUBLICATIONS

Kubernetes | "Open-source system for automating deployment." Website https://kubernetes.io/, last accessed Feb. 7, 2023, 6 pages.

(Continued)

*Primary Examiner* — Tuan C Dao
(74) *Attorney, Agent, or Firm* — Amin, Turocy & Watson, LLP

(57) ABSTRACT

Systems/techniques that facilitate improved start and stop of containerized applications are provided. In various embodiments, a system can comprise a containerized software application that includes a plurality of first software pods and that includes a software manifest which specifies a plurality of replica cardinalities to be respectively satisfied by the plurality of first software pods. In various aspects, the system can comprise a controller software pod of the containerized software application. In various instances, the controller software pod can access an electronic command requesting that the plurality of first software pods be started or stopped. In various cases, the controller software pod can respond to the electronic command by editing the plurality of replica cardinalities.

20 Claims, 13 Drawing Sheets

(56) References Cited

U.S. PATENT DOCUMENTS

| | | | | |
|---|---|---|---|---|
| 2010/0186014 | A1* | 7/2010 | Vaghani | G06F 3/0647 711/6 |
| 2010/0332789 | A1* | 12/2010 | Sugumar | G06F 12/1081 711/207 |
| 2012/0131124 | A1* | 5/2012 | Frey | G06F 15/16 709/212 |
| 2012/0266168 | A1* | 10/2012 | Spivak | G06F 8/71 718/1 |
| 2013/0152209 | A1* | 6/2013 | Baumann | G06F 21/74 726/26 |
| 2013/0305242 | A1* | 11/2013 | Wang | G06F 9/45558 718/1 |
| 2015/0052218 | A1* | 2/2015 | Zhang | H04L 67/10 709/217 |
| 2015/0293776 | A1* | 10/2015 | Persson | G06F 9/50 718/1 |
| 2016/0170792 | A1* | 6/2016 | Kato | G06F 9/5077 718/1 |
| 2016/0378563 | A1* | 12/2016 | Gaurav | G06F 9/45558 718/1 |
| 2018/0088800 | A1* | 3/2018 | Provost | G06F 3/04883 |
| 2019/0065323 | A1* | 2/2019 | Dhamdhere | G06F 11/1484 |
| 2019/0179720 | A1* | 6/2019 | Chen | G06F 9/485 |
| 2019/0207940 | A1* | 7/2019 | Kleinpeter | G06F 16/152 |
| 2020/0004590 | A1* | 1/2020 | Tang | G06F 9/5005 |
| 2020/0034254 | A1 | 1/2020 | Natanzon | |
| 2020/0133731 | A1* | 4/2020 | Barbara | G06F 9/542 |
| 2020/0249928 | A1* | 8/2020 | Zeng | G06F 8/65 |
| 2020/0285619 | A1* | 9/2020 | Teyer | G06F 16/2282 |
| 2020/0303060 | A1* | 9/2020 | Haemel | G06N 3/082 |
| 2021/0208954 | A1* | 7/2021 | Stephens | G06F 9/3851 |
| 2021/0318824 | A1* | 10/2021 | Cain | G06F 3/0604 |
| 2022/0206902 | A1 | 6/2022 | Hoang et al. | |
| 2022/0277075 | A1* | 9/2022 | Cummings | H04L 67/51 |
| 2022/0398173 | A1 | 12/2022 | Rodriguez Bravo et al. | |
| 2023/0050796 | A1* | 2/2023 | Ghergu | G06F 9/505 |
| 2023/0101885 | A1 | 3/2023 | Apfelbaum et al. | |
| 2023/0169168 | A1* | 6/2023 | Magen Medina | G06F 9/45558 726/23 |
| 2023/0195497 | A1* | 6/2023 | Ota | G06F 8/60 718/1 |

OTHER PUBLICATIONS

Kubernetes | "Persistent Volumes." Website https://kubernetes.io/docs/concepts/storage/persistent-volumes/, last accessed Feb. 7, 2023, 21 pages.

IBM | "Stopping and starting a Kubernetes cluster and pods." Website https://www.ibm.com/docs/en/fci/1.0.2?topic=SSCKRH_1.0.2/platform/t_start_stop_kube_cluster.html, last updated Mar. 3, 2021, last accessed Feb. 7, 2023, 3 pages.

Non-Final Office Action received for U.S. Appl. No. 18/311,593 dated Oct. 28, 2025, 23 pages.

* cited by examiner

100

1000

ACCESSING, BY A CONTROLLER SOFTWARE POD OF A CONTAINERIZED SOFTWARE APPLICATION, AN ELECTRONIC COMMAND REQUESTING THAT A PLURALITY OF FIRST SOFTWARE PODS OF THE CONTAINERIZED SOFTWARE APPLICATION BE STARTED OR STOPPED, WHEREIN THE CONTAINERIZED SOFTWARE APPLICATION INCLUDES A SOFTWARE MANIFEST WHICH SPECIFIES A PLURALITY OF REPLICA CARDINALITIES TO BE RESPECTIVELY SATISFIED BY THE PLURALITY OF FIRST SOFTWARE PODS

1002

RESPONDING, BY THE CONTROLLER SOFTWARE POD, TO THE ELECTRONIC COMMAND BY EDITING THE PLURALITY OF REPLICA CARDINALITIES

1004

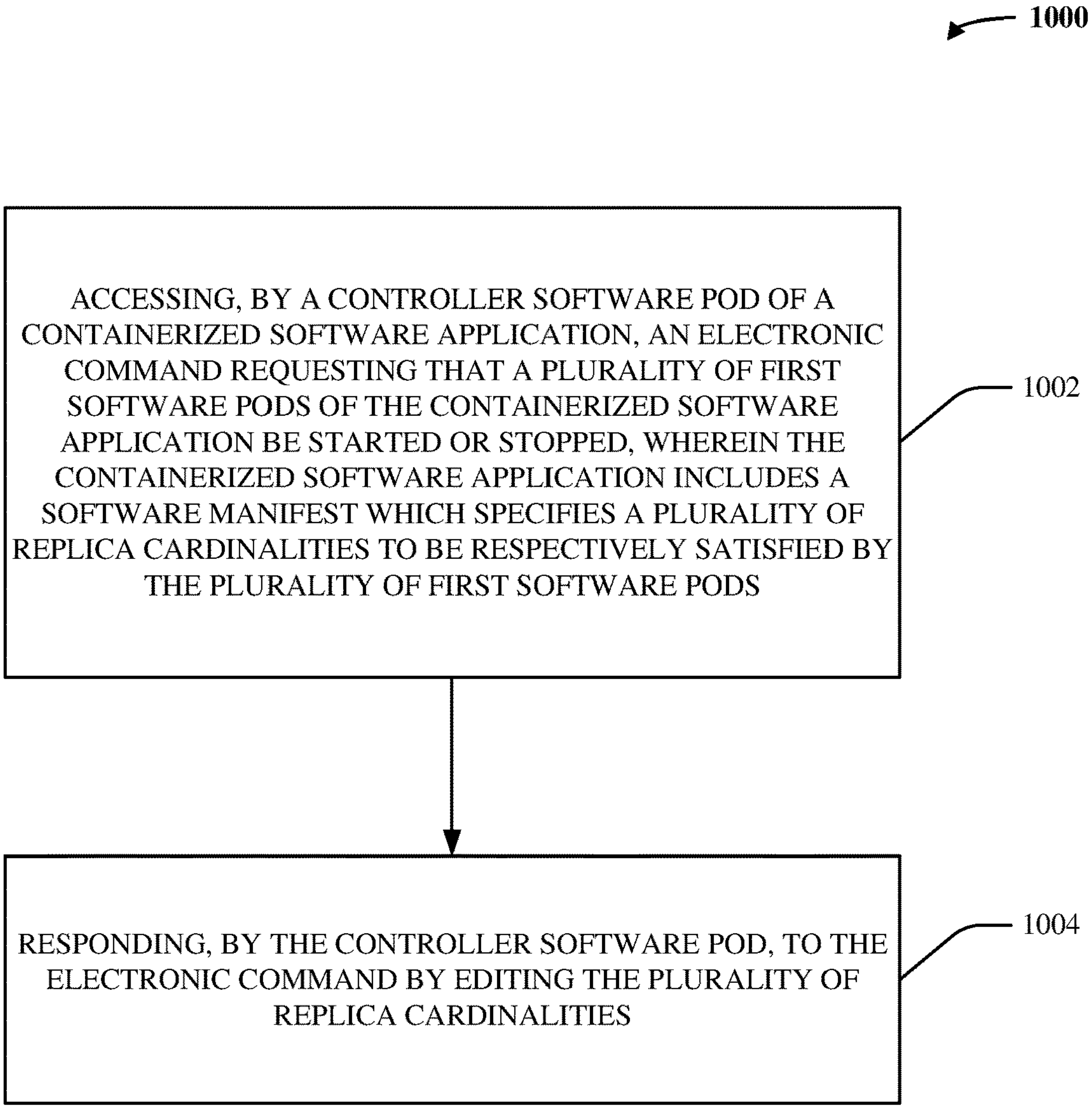

ACCESSING, BY A CONTROLLER SOFTWARE POD OF A CONTAINERIZED SOFTWARE APPLICATION HOSTED ON A COMPUTING DEVICE, A FIRST ELECTRONIC NOTIFICATION INDICATING A SCHEDULED TIME AT WHICH MAINTENANCE IS TO BE PERFORMED ON THE COMPUTING DEVICE

1102

IN RESPONSE TO THE FIRST ELECTRONIC NOTIFICATION, SCALING, BY THE CONTROLLER SOFTWARE POD, REPLICA CARDINALITIES CORRESPONDING TO ALL OTHER SOFTWARE PODS OF THE CONTAINERIZED SOFTWARE APPLICATION TO ZERO VALUES AT OR BEFORE THE SCHEDULED TIME

1104

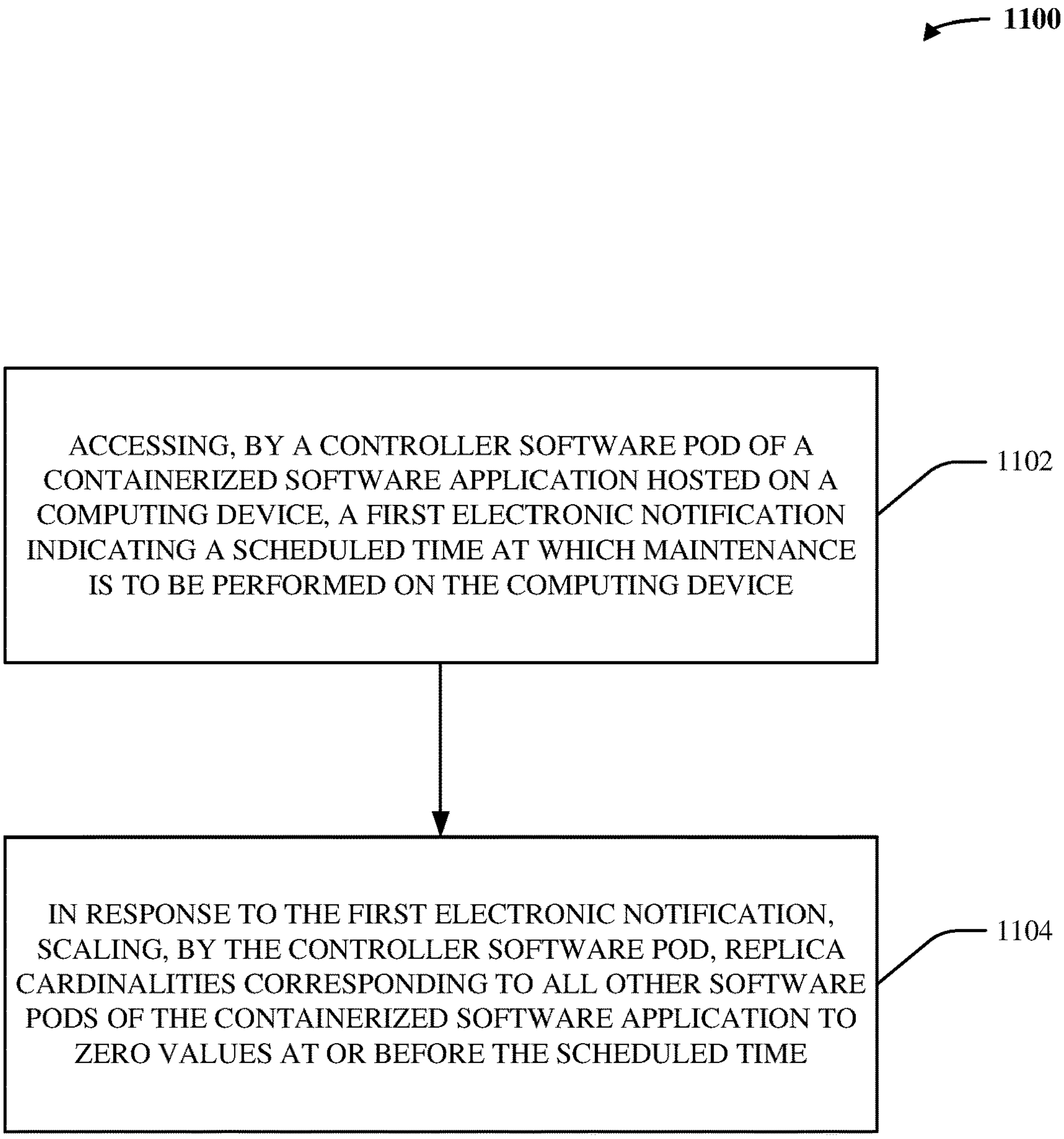

FIG. 11

START AND STOP OF CONTAINERIZED APPLICATIONS

TECHNICAL FIELD

The subject disclosure relates generally to containerized applications, and more specifically to improved start and stop of containerized applications.

BACKGROUND

A containerized application can be hosted on a computing device. To operate or run on the computing device, the containerized application should first be started. On the other hand, to perform maintenance on the computing device, the containerized application should first be stopped. In certain operational contexts, a legacy containerized application can be started only via a full boot-from-scratch and stopped only via deletion. Unfortunately, starting and stopping the legacy containerized application in such fashion can yield excessively long boot-up times and can cause stored or preserved state data to be lost.

Accordingly, systems or techniques that can facilitate improved start and stop of containerized applications can be considered as desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate improved start and stop of containerized applications are described.

According to one or more embodiments, a system is provided. The system can comprise a containerized software application. In various aspects, the containerized software application can include a plurality of first software pods and can include a software manifest which specifies a plurality of replica cardinalities to be respectively satisfied by the plurality of first software pods. In various instances, the system can further comprise a controller software pod of the containerized software application. In various cases, the controller software pod can access an electronic command requesting that the plurality of first software pods be started or stopped. In various aspects, the controller software pod can respond to the electronic command by editing the plurality of replica cardinalities.

According to one or more embodiments, a computer-implemented method is provided. In various embodiments, the computer-implemented method can comprise accessing, by a controller software pod of a containerized software application, an electronic command requesting that a plurality of first software pods of the containerized software application be started or stopped. In various aspects, the containerized software application can include a software manifest which specifies a plurality of replica cardinalities to be respectively satisfied by the plurality of first software pods. In various instances, the computer-implemented method can further comprise responding, by the controller software pod, to the electronic command by editing the plurality of replica cardinalities.

According to one or more embodiments, a computer-implemented method is provided. In various aspects, the computer-implemented method can comprise accessing, by a controller software pod of a containerized software application hosted on a computing device, a first electronic notification indicating a scheduled time at which maintenance is to be performed on the computing device. In various instances, the computer-implemented method can comprise, in response to the first electronic notification, scaling, by the controller software pod, replica cardinalities corresponding to all other software pods of the containerized software application to zero values at or before the scheduled time.

DESCRIPTION OF THE DRAWINGS

FIGS. 10-11 illustrate flow diagram of example, non-limiting computer-implemented methods that facilitate improved start and stop of containerized applications in accordance with one or more embodiments described herein.

DETAILED DESCRIPTION

Figure 1:
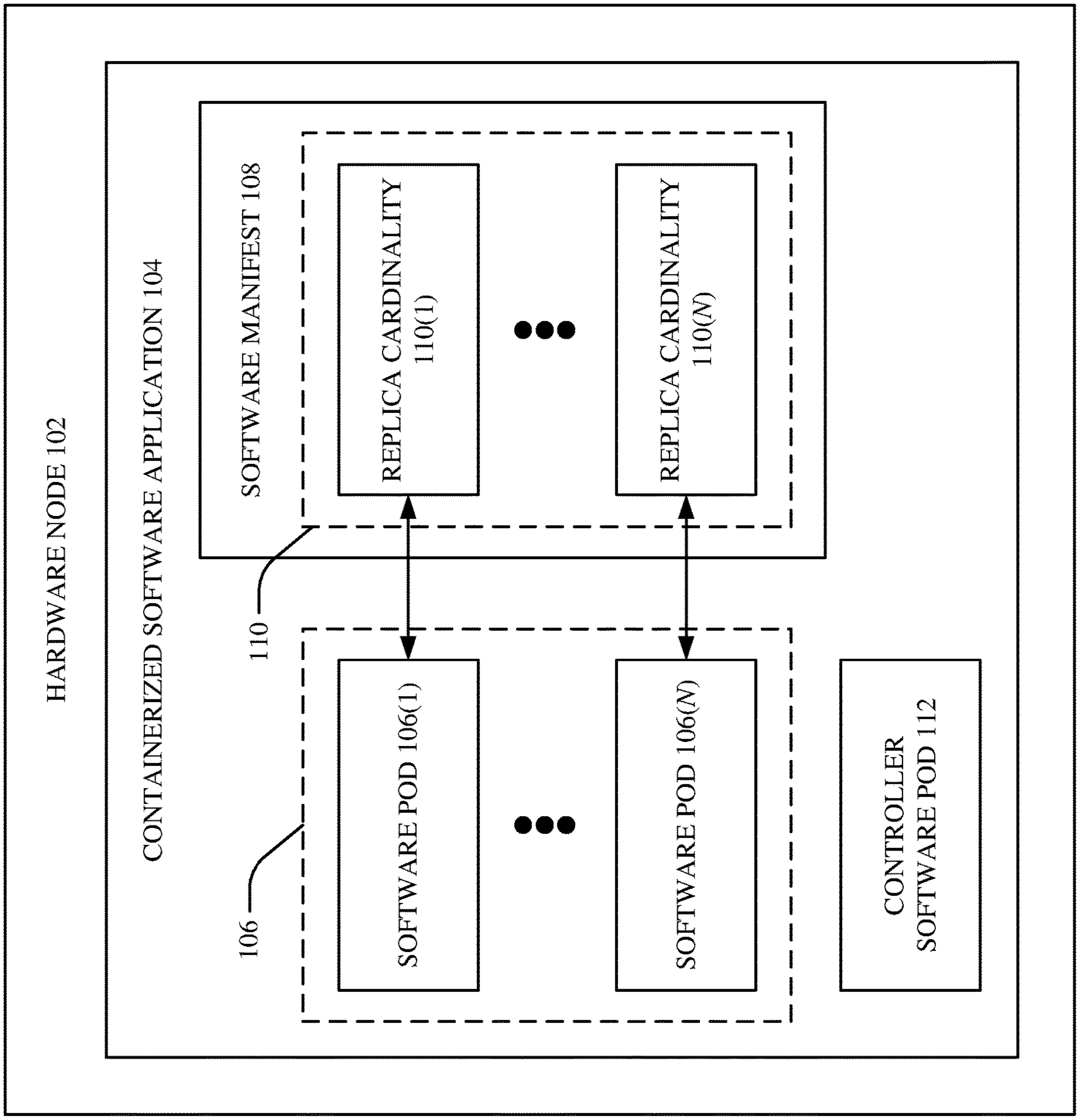
FIG. 1 illustrates a block diagram of an example, non-limiting system that facilitates improved start and stop of containerized applications in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A containerized application can be hosted on a computing device (e.g., can be hosted on any suitable computer-executable hardware comprising one or more processors). In various aspects, the containerized application can be any suitable computer-executable software that can be organized into isolated runtime environments called containers that encapsulate the computer-executable software with its dependencies (e.g., with whatever system libraries, binaries, or configuration files on which the software relies). Accordingly, the containerized application can be considered as being modular, portable, self-contained, or otherwise not dependent upon any particular underlying hardware (e.g., the containerized application can be implemented across computing devices, regardless of those computing devices' unique properties, characteristics, or attributes). The containerized application can be configured or managed via any suitable container orchestration platform, such as Kubernetes or Docker swarm.

"Starting" the containerized application (or a portion thereof) can be considered as initiating operation, running, or execution of the containerized application on whatever computing device hosts it. Conversely, "stopping" the containerized application (or a portion thereof) can be considered as ceasing operation, running, or execution of the containerized application on whatever computing device hosts it.

In various aspects, maintenance of the computing device can be properly performed while the containerized application is stopped and not while the containerized application is started.

In some operational contexts, a containerized application (e.g., such as a legacy containerized application that is old, aging, or otherwise becoming outdated) can be started only via a full boot-from-scratch (e.g., only by completing a full, time-consuming installation procedure, such as an EML start, of the legacy containerized application on the computing device that hosts it). Similarly, in some operational contexts, a containerized application can be stopped only via deletion (e.g., only by uninstalling the legacy containerized application from the computing device that hosts it).

Unfortunately, starting the containerized application via full boots-from-scratch can yield excessively long boot-up times. Indeed, one full boot-from-scratch can consume on the order of five to ten minutes, and thus repetitively performing such full boots-from-scratch can be considered as unacceptably time-consuming. Such excessive consumption of time can be even further exacerbated in the medical or clinical context, in which medical imaging software can be deployed as a containerized application hosted on medical imaging scanners (e.g., computed tomography (CT) scanners, magnetic resonance imaging (MRI) scanners, X-ray scanners, positron emission tomography (PET) scanners, ultrasound scanners), and in which such medical imaging scanners require frequent maintenance (e.g., and thus frequent deletions and full boots-from-scratch) to address performance degradation. Moreover, stopping the containerized application via deletion can cause stored or preserved state data to be lost. Indeed, when a pod (e.g., a logical wrapper for one or more containers) of the containerized application is deleted, whatever container data or persistent volume data that was previously stored in that pod can be irretrievably lost.

Accordingly, systems or techniques that can facilitate improved start and stop of containerized applications can be considered as desirable.

Various embodiments described herein can address one or more of these technical problems. One or more embodiments described herein can include systems, computer-implemented methods, apparatus, or computer program products that can facilitate improved start and stop of containerized applications. In other words, the inventors of various embodiments described herein devised various techniques for facilitating start and stop of a containerized application, which techniques can reduce cumulative boot-up times and can preserve application state data. In particular, for any given containerized application hosted by a computing device, various embodiments described herein can involve creating within the containerized application a controller pod. In various instances, as described herein, the controller pod can orchestrate starts and stops for all other pods of the containerized application, by editing replica cardinalities for all those other pods that are specified in a manifest of the containerized application.

More specifically, the controller pod can stop any given pod of the containerized application by scaling the replica cardinality of that given pod from a non-zero value to a zero value. When the replica cardinality of that given pod is set to zero, that given pod can be considered as consuming no (or no more than a threshold amount of) resources (e.g., processing capacity) of the computing device, but that given pod can nevertheless be considered as not having been deleted or uninstalled from the computing device. Accordingly, that given pod can be considered as no longer running or executing, yet whatever container data or persistent volume data that was stored in that given pod can be considered as being preserved or otherwise not lost. In some cases, scaling the replica cardinality of the given pod to zero can be referred to as a soft-stop of the given pod. In contrast, deleting or uninstalling the given pod can be considered as a hard-stop of the given pod. As described herein, a soft-stop can cease execution of the given pod without losing the persistent volume data of that given pod, unlike a hard-stop.

Similarly, in various aspects, the controller pod can start the given pod by scaling the replica cardinality of that given pod from a zero value to a non-zero value. When the replica cardinality of that given pod is set to non-zero, that given pod can be considered as running or executing on the computing device. However, note that adjusting the replica cardinality in such fashion can consume less time (e.g., many orders of magnitude less time) as compared to fully booting-up the given pod from scratch (e.g., as compared to performing a lengthy installation procedure for the given pod). In some cases, scaling the replica cardinality of the given pod to non-zero can be referred to as a soft-start of the given pod. In contrast, installing or booting-from-scratch the given pod can be referred to as a hard-start of the given pod. As described herein, a soft-start can initiate execution or running of the given pod on the computing device in much less time than a hard-start.

Accordingly, the controller pod as described herein can be considered as a constituent microservice of the containerized application, which constituent microservice can soft-start or soft-stop all or fewer than all other pods (e.g., other microservices) of the containerized application, by editing or scaling the replica cardinalities of those other pods.

For additional, non-limiting aspects, consider the following discussion. According to various embodiments, there can be a containerized application hosted (or desired to be hosted) on a hardware node. In various aspects, the hardware node can be any suitable computing device having any suitable number of computer processors or any suitable number of non-transitory computer-readable memories. In various instances, the containerized application can include a plurality of first pods, any of which can store, control, or otherwise orchestrate any suitable number of any suitable containers or any suitable number of any suitable persistent volumes.

In various cases, the containerized application can also include a manifest (e.g., a Kubernetes deployment or a Kubernetes StatefulSet). In various aspects, the manifest can specify a plurality of replica cardinalities to be respectively satisfied by the plurality of first pods. In other words, the manifest can specify a respective replica cardinality for each of the plurality of first pods. In various cases, a replica cardinality can be any suitable non-negative integer that indicates how many instances, replicas, duplicates, or copies of a respective one of the plurality of first pods are to be run or executed by the containerized application.

In various aspects, the containerized application can further include a controller pod. In various instances, the controller pod can edit any of the plurality of replica cardinalities. In particular, the controller pod can orchestrate starts or stops of any of the plurality of first pods, by scaling any of the plurality of replica cardinalities to or from zero. In other words, the controller pod can scale any given replica cardinality specified in the manifest to or from zero, and the containerized application can commensurately adjust the number of running instances of whichever of the plurality of first pods corresponds to that given replica cardinality.

In some embodiments, the controller pod can edit any of the plurality of replica cardinalities in response to being invoked by a user of the containerized application. More specifically, the user can input, via any suitable user-interface (e.g., keyboard, keypad, touch screen) of the hardware node, an electronic command. In various aspects, the electronic command can specify one or more namespaces associated with the containerized application, and the electronic command can request that whichever of the plurality of first pods belong to those one or more namespaces be started or stopped. In response to the electronic command, the controller pod can perform any suitable security checks (e.g., role-based access control checks) or validation checks (e.g., checking whether the one or more namespaces are correct or existent) with respect to the electronic command. If the electronic command passes or satisfies such checks, the controller pod can appropriately adjust the replica cardinalities of whichever of the plurality of first pods belong to the one or more namespaces. For example, suppose that the electronic command requests that whichever first pods belong to the one or more namespaces be started. In such case, the controller pod can set the replica cardinalities of whichever first pods belong to the one or more namespaces to non-zero values. That is, the controller pod can soft-start those first pods. As another example, suppose that the electronic command requests that whichever first pods belong to the one or more namespaces be stopped. In such case, the controller pod can set the replica cardinalities of whichever first pods belong to the one or more namespaces to zero values. That is, the controller pod can soft-stop those first pods. In this way, whichever of the plurality of first pods belong to the one or more namespaces can be started or stopped, without undergoing full boots-from-scratch, and without losing any of their container data or persistent volume data.

In other embodiments, the controller pod can edit any of the plurality of replica cardinalities in response to scheduled maintenance notifications associated with the hardware node. More specifically, the containerized application can receive or access a first electronic notification specifying a scheduled time (e.g., year, month, day, hour, minute, second) at which maintenance (e.g., repair, recalibration, modification) of the hardware node is planned, desired, or recommended to be performed. In some cases, the first electronic notification can be inputted by a user of the containerized application via any suitable user-interface of the hardware node. In other cases, the first electronic notification can be an automated notification generated by or transmitted from any suitable computing device or computing system that monitors, tracks, schedules, or recommends maintenance for the hardware node. In yet other cases, the first electronic notification can be an automated notification generated by the hardware node itself. In various aspects, the controller pod can respond to the first electronic notification by scaling to zero all of the plurality of replica cardinalities at (or within any suitable margin before) the scheduled time specified in the first electronic notification. In other words, the controller pod can respond to the first electronic notification by soft-stopping all of the plurality of first pods of the containerized application. Soft-stopping all of the plurality of first pods in this fashion can allow for the planned, desired, or recommended maintenance to be performed on the hardware node at the scheduled time. In various aspects, the containerized application can, at some point in time, receive or access a second electronic notification indicating that the planned, desired, or scheduled maintenance has been completed. In some cases, the second electronic notification can be inputted by the user of the containerized application via the user-interface of the hardware node. In other cases, the second electronic notification can be an automated notification generated by or transmitted from whatever computing device or computing system that monitors, tracks, schedules, or recommends maintenance for the hardware node. In yet other cases, the second electronic notification can be an automated notification generated by the hardware node itself. In various instances, the controller pod can respond to the second electronic notification by scaling to non-zero all of the plurality of replica cardinalities. In other words, the controller pod can respond to the second electronic notification by soft-starting all of the plurality of first pods of the containerized application. In this way, the plurality of first pods can be automatically stopped for performance of maintenance on the hardware node and can be automatically started after completion of such maintenance, without undergoing full boots-from-scratch, and without losing any of their container data or persistent volume data.

In still other embodiments, the controller pod can edit any of the plurality of replica cardinalities in response to failed inter-pod dependency calls associated with the containerized application. More specifically, the containerized application can receive or access an electronic notification indicating that one of the plurality of first pods (which can be referred to as pod A for ease of explanation) attempted to call or invoke another of the plurality of first pods (which can be referred to as pod B for ease of explanation) and that such call or invocation failed. In other words, pod A can be considered as depending upon pod B, such that pod A cannot properly operate if pod B is not properly operating. In various aspects, the electronic notification can be generated by pod A in response to the failure of its call or invocation of pod B. In various instances, the controller pod can respond to the electronic notification by scaling the replica cardinality of pod B to a non-zero value and instructing pod A to retry its call or invocation of pod B. In other words, the controller pod can respond to the electronic notification by ensuring that pod B has been soft-started and asking pod A to retry its dependency call. In this way, the controller pod can be considered as automatically attempting to resolve a failed dependency call that occurs within the containerized application.

In yet other embodiments, the controller pod can edit any of the plurality of replica cardinalities in response to an uninstallation command from a user of the containerized application. More specifically, the user can input, via any suitable user-interface of the hardware node, an electronic command. In various aspects, the electronic command can specify one or more namespaces associated with the containerized application, and the electronic command can request that whichever of the plurality of first pods belong to those one or more namespaces be uninstalled or deleted from the hardware node. In response to the electronic command, the controller pod can perform any suitable security checks or validation checks with respect to the electronic command. If the electronic command passes or satisfies such checks, the controller pod can refrain from uninstalling or deleting whichever first pods belong to the one or more namespaces; instead, the controller pod can scale the replica cardinalities of those first pods to zero. In other words, the controller pod can respond to an uninstallation command by performing a soft-stop instead of an uninstallation. In this way, the controller pod can be considered as a backstop or failsafe that can automatically override a potentially mistaken or potentially malicious user command, thereby helping to preserve persistent volume data and reduce cumulative boot-up times for the containerized application.

Various embodiments described herein can be employed to use hardware or software to solve problems that are highly technical in nature (e.g., to facilitate improved start and stop of containerized applications), that are not abstract and that cannot be performed as a set of mental acts by a human. Further, some of the processes performed can be performed by a specialized computer (e.g., specified pods deployed by container orchestration platforms such as Kubernetes) for carrying out defined acts related to improved start and stop of containerized applications. For example, such defined acts can include: accessing, by a controller software pod of a containerized software application, an electronic command requesting that a plurality of first software pods of the containerized software application be started or stopped, where the containerized software application includes a software manifest which specifies a plurality of replica cardinalities to be respectively satisfied by the plurality of first software pods; and responding, by the controller software pod, to the electronic command by editing the plurality of replica cardinalities.

Such defined acts are not performed manually by humans. Indeed, neither the human mind nor a human with pen and paper can electronically access an instruction to start or stop one or more particular pods of a containerized application (e.g., an application running on Kubernetes or Docker swarm) and electronically respond to such instruction by editing or adjusting replica cardinalities corresponding to those particular pods that are specified in a manifest (e.g., Kubernetes deployment or StatefulSet) of the containerized application. Indeed, a containerized software application is an inherently-computerized construct that cannot be meaningfully implemented in any way by the human mind without computers. Furthermore, replica cardinalities are specific coding parameters governing the behavior of a containerized software application and likewise cannot be meaningfully implemented in any way by the human mind without computers. Further still, a pod of a containerized software application is a specific, discrete building-block of a containerized software application that can deploy containers or persistent volumes; the human mind, even with the assistance of pen and paper, cannot in any meaningful way deploy containers or persistent volumes and thus cannot reasonably be considered as a pod of a containerized software application. Accordingly, techniques that involve configuring a pod of a containerized software application to start and stop other pods of the containerized software application by editing the replica cardinalities of those other pods are likewise inherently-computerized and cannot be implemented in any sensible, practical, or reasonable way without computers.

Moreover, various embodiments described herein can integrate into a practical application various teachings relating to improved start and stop of containerized applications. As explained above, some containerized applications (e.g., such as legacy programs) can be started only via full installations or boots-from-scratch, which can be excessively time consuming. As also explained above, some containerized applications (e.g., again, such as legacy programs) can be stopped only via full uninstallation or deletion, which can cause loss of persistent volume data. Various embodiments described herein can address one or more of these technical problems. Specifically, various embodiments described herein can be implemented as a controller pod of a containerized application, where the controller pod can soft-start or soft-stop any other pod of the containerized application by editing the replica cardinality of that other pod. As an example, the controller pod can soft-start that other pod by adjusting its replica cardinality from zero to non-zero. As another example, the controller pod can soft-stop that other pod by adjusting its replica cardinality from non-zero to zero. Such soft-starts and soft-stops can eliminate or otherwise reduce any need to perform full installations or full uninstallations of pods of the containerized applications. Accordingly, the controller pod can start other pods of the containerized application while helping to reduce the cumulative boot-up time associated with the containerized application, and the controller pod can stop other pods of the containerized applications without losing or deleting persistent volume data. Thus, various embodiments described herein certainly constitute concrete and tangible technical improvements in the field of containerized applications, and such embodiments therefore clearly qualify as useful and practical applications of computers.

It should be appreciated that the herein figures and description provide non-limiting examples of various embodiments and are not necessarily drawn to scale.

FIG. 1 illustrates a block diagram of an example, non-limiting system 100 that can facilitate improved start and stop of containerized applications in accordance with one or more embodiments described herein.

In various embodiments, there can be a hardware node 102. In various aspects, the hardware node 102 can be any suitable computing device which can comprise any suitable number of processors (e.g., computer processing units, microprocessors) and any suitable number of non-transitory computer-readable memories (e.g., hard disk drives, solid state drives). As a non-limiting example, the hardware node 102 can be a desktop computer. As another non-limiting example, the hardware node 102 can be a laptop computer. As yet another non-limiting example, the hardware node 102 can be a smart phone. As even another non-limiting example, the hardware node 102 can be a vehicle-integrated computer. As still another non-limiting example, the hardware node 102 can be a medical imaging scanner, such as a CT scanner, an MRI scanner, an X-ray scanner, a PET scanner, or an ultrasound scanner.

In various embodiments, the hardware node 102 can host a containerized software application 104. In various aspects, the containerized software application 104 can be any suitable computer program that can be implemented or organized in containerized fashion. As a non-limiting example, the containerized software application 104 can be a medical imaging program, a medical diagnostic program, or a medical prognostic program in situations where the hardware node 102 is a medical imaging scanner. As another non-limiting example, the containerized software application 104 can be a self-driving program, an engine monitoring program, or a traffic monitoring program in situations where the hardware node 102 is a vehicle-integrated computer. In various instances, the containerized software application 104 can be implemented, organized, or otherwise facilitated by any suitable container orchestration platforms. As a non-limiting example, the containerized software application 104 can be implemented, organized, or otherwise facilitated by Kubernetes. As another non-limiting example, the containerized software application 104 can be implemented, organized, or otherwise facilitated by Docker swarm.

In various aspects, the containerized software application 104 can comprise a set of software pods 106. In various instances, the set of software pods 106 can comprise n pods for any suitable positive integer n: a software pod 106(1) to a software pod 106(*n*). In various cases, a software pod can be considered as a logical wrapper that can facilitate or deploy any suitable number of software containers (e.g., Kubernetes containers) or persistent volumes. As a non-limiting example, the software pod 106(1) can be a logical wrapper for a first collection of any suitable software containers or a first collection of any suitable persistent volumes. As another non-limiting example, the software pod 106(*n*) can be a logical wrapper for an n-th collection of any suitable software containers or an n-th collection of any suitable persistent volumes. In various aspects, different ones of the set of software pods 106 can have the same or different software containers as each other or can have the same or different persistent volumes as each other.

In various instances, the containerized software application 104 can comprise a software manifest 108. In various cases, the software manifest 108 can be any suitable electronic document or electronic data that can declare parameters, characteristics, or attributes governing the containerized software application 104. In particular, the software manifest 108 can specify a set of replica cardinalities 110 which can respectively correspond (e.g., in one-to-one fashion) with the set of software pods 106. Thus, because the set of software pods 106 can comprise n pods, the set of replica cardinalities 110 can likewise comprise n cardinalities: a replica cardinality 110(1) to a replica cardinality 110(*n*). In various aspects, each of the set of replica cardinalities 110 can be a scalar having a non-negative integer value and can indicate how many instances, duplicates, copies, or replicas of a respective one of the set of software pods 106 are to be instantiated by the containerized software application 104. As a non-limiting example, the software pod 106(1) can correspond to the replica cardinality 110(1), and the replica cardinality 110(1) can have a value or magnitude of x for any suitable integer 0≤x. This can cause the containerized software application 104 to generate, create, run, execute, initiate, or otherwise implement a total of x instantiations (e.g., x replicas) of the software pod 106(1). As another non-limiting example, the software pod 106(*n*) can correspond to the replica cardinality 110(*n*), and the replica cardinality 110(*n*) can have a value or magnitude of y for any suitable integer 0≤y. This can cause the containerized software application 104 to generate, create, run, execute, initiate, or otherwise implement a total of y instantiations (e.g., y replicas) of the software pod 106(*n*). Note that different ones of the set of software pods 106 can have the same or different replica cardinalities as each other.

In situations where the containerized software application 104 is orchestrated via Kubernetes, the software manifest 108 can be considered as a Kubernetes deployment or a Kubernetes StatefulSet.

In various aspects, the containerized software application 104 can comprise a controller software pod 112. In various instances, the controller software pod 112 can be any suitable software pod of the containerized software application 104 which can edit, adjust, change, or otherwise modify any of the set of replica cardinalities 110 declared in the software manifest 108. Although not explicitly shown in the figures, the controller software pod 112 can comprise any suitable software containers or any suitable persistent volumes that can enable or otherwise assist in editing, adjusting, changing, or modifying the set of replica cardinalities 110.

In any case, the controller software pod 112 can perform a soft-start for any of the set of software pods 106 by scaling or setting whichever of the set of replica cardinalities 110 that corresponds to that software pod to a non-zero value. Conversely, the controller software pod 112 can perform a soft-stop for any of the set of software pods 106 by scaling or setting whichever of the set of replica cardinalities 110 that corresponds to that software pod to a zero value.

In some embodiments, the controller software pod 112 can soft-start or soft-stop any of the set of software pods 106 in response to an invocation by a user of the containerized software application 104. Various non-limiting aspects of such embodiments are described with respect to FIGS. 2-5.

In other embodiments, the controller software pod 112 can soft-start or soft-stop any of the set of software pods 106 in response to scheduled maintenance notifications associated with the hardware node 102. Various non-limiting aspects of such embodiments are described with respect to FIGS. 6-7.

In yet other embodiments, the controller software pod 112 can soft-start or soft-stop any of the set of software pods 106 in response to a failed dependency call made from one of the set of software pods 106 to another of the set of software pods 106. Various non-limiting aspects of such embodiments are described with respect to FIGS. 8-9.

Figure 2:
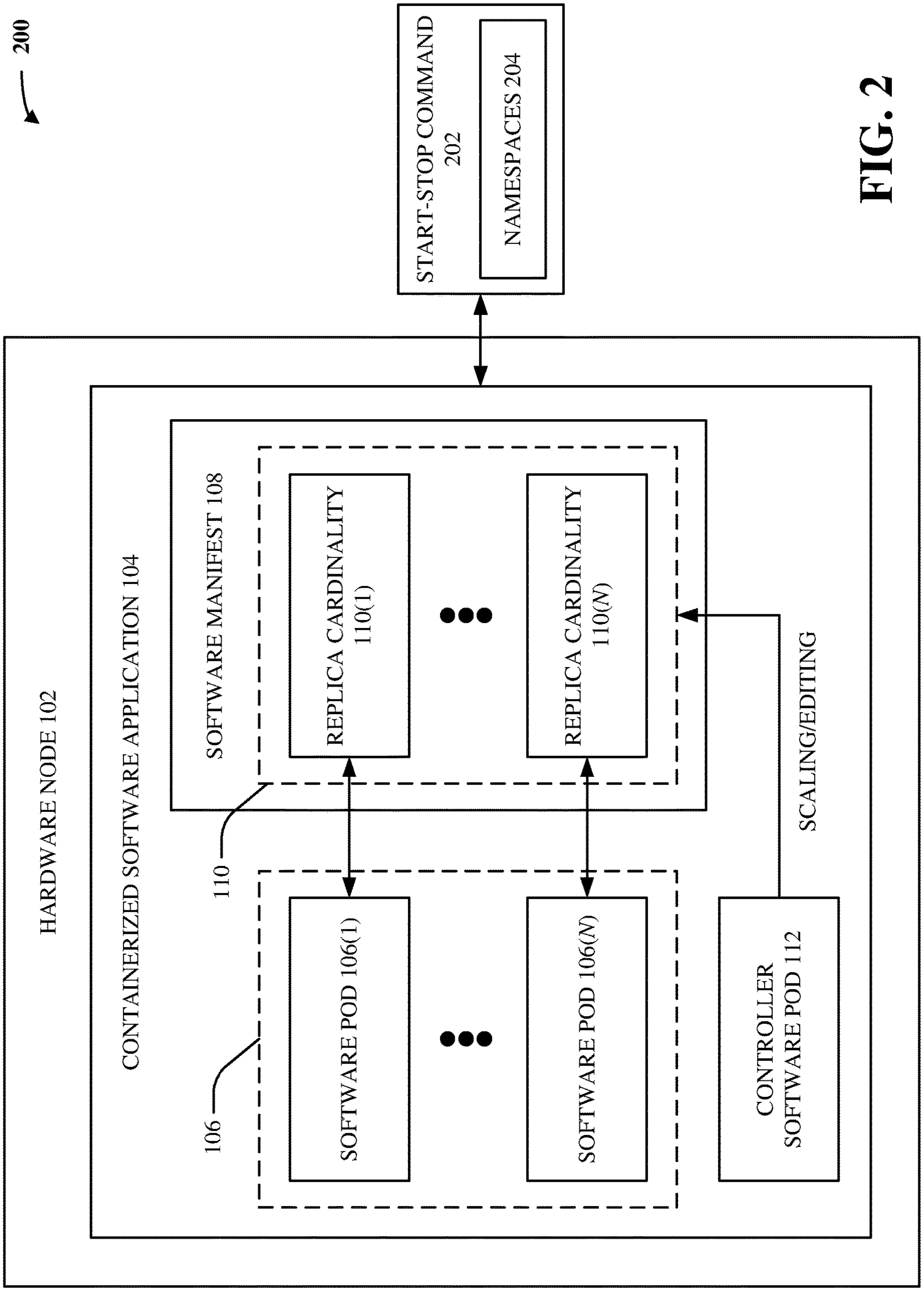
FIG. 2 illustrates a block diagram of an example, non-limiting system including replica cardinality scaling or editing in response to a start-stop command that facilitates improved start and stop of containerized applications in accordance with one or more embodiments described herein.

FIG. 2 illustrates a block diagram of an example, non-limiting system 200 including replica cardinality scaling or editing in response to a start-stop command that can facilitate improved start and stop of containerized applications in accordance with one or more embodiments described herein. As shown, the system 200 can, in some cases, comprise the same components as the system 100, and can further comprise a start-stop command 202.

In various embodiments, the controller software pod 112 can electronically receive or otherwise electronically access the start-stop command 202. In various aspects, a user associated with the hardware node 102 or with the containerized software application 104 can create the start-stop command 202 by interacting with any suitable user-interface of the hardware node 102. As a non-limiting example, the user can create the start-stop command 202 by interacting with the hardware node 102 via a keyboard, keypad, or computer mouse of the hardware node 102. As another non-limiting example, the user can create the start-stop command 202 by interacting with the hardware node 102 via a touchscreen of the hardware node 102. As even another non-limiting example, the user can create the start-stop command 202 by interacting with the hardware node 102 via a voice control system of the hardware node 102.

In any case, the start-stop command 202 can be any suitable electronic notification, any suitable electronic message, or any suitable electronic instruction that can specify one or more namespaces 204. In various instances, a namespace can be any suitable alphanumeric identifier that can correspond to or otherwise identify one or more of the set of software pods 106. In various cases, the start-stop command 202 can be considered, treated, or otherwise interpreted as a request to start or to stop whichever of the set of software pods 106 belong to (e.g., correspond to or are identified by) the one or more namespaces 204. In other words, the start-stop command 202 can filter through the set of software pods 106 according to namespace (e.g., the one or more namespaces 204 can, in some cases, encompass or identify all of the set of software pods 106; the one or more namespaces 204 can, in other cases, encompass or identify fewer than all of the set of software pods 106).

In various aspects, the controller software pod 112 can perform any suitable verification checks on the start-stop command 202. As a non-limiting example, the controller software pod 112 can perform any suitable role-based access control checks on the start-stop command 202. As another non-limiting example, the controller software pod 112 can check whether the one or more namespaces 204 exist or are otherwise properly associated with the containerized software application 104. In any case, if the start-stop command 202 passes or satisfies such verification checks, the controller software pod 112 can determine that the start-stop command 202 is valid. On the other hand, if the start-stop command 202 fails to pass or satisfy such verification checks, the controller software pod 112 can determine that the start-stop command 202 is invalid.

In various instances, in response to determining that the start-stop command 202 is invalid, the controller software pod 112 can ignore or otherwise disregard the start-stop command 202. In various other instances, in response to determining that the start-stop command 202 is invalid, the controller software pod 112 can generate, transmit, or render any suitable warning or invalidity notification to or on any suitable computing device or electronic display (not shown). However, in response to determining that the start-stop command 202 is valid, the controller software pod 112 can, as shown, scale, edit, or otherwise adjust the set of replica cardinalities 110 in accordance with the start-stop command 202.

For instance, suppose that the start-stop command 202 requests that whichever of the set of software pods 106 that belong to the one or more namespaces 204 be started. In such case, the controller software pod 112 can identify which of the set of software pods 106 belong to the one or more namespaces 204, the controller software pod 112 can identify which of the set of replica cardinalities 110 correspond to those identified software pods, and the controller software pod 112 can set or configure those identified replica cardinalities to non-zero values (e.g., to any suitable positive integer values).

As a non-limiting example, the start-stop command 202 can request that the software pod 106(1) be started. Accordingly, the controller software pod 112 can set or otherwise configure the replica cardinality 110(1) to any suitable non-zero value (e.g., 1). In response to such setting or configuration of the replica cardinality 110(1), the containerized software application 104 can automatically adjust how many instantiations of the software pod 106(1) it is running, so as to be in accordance or compliance with the adjusted value of the replica cardinality 110(1). Note that such a soft-start of the software pod 106(1) (e.g., scaling the replica cardinality 110(1) to non-zero and subsequently altering the number of running instantiations of the software pod 106(1)) can consume mere seconds. Contrast this with a hard start (e.g., a full installation or boot-from-scratch) of the software pod 106(1), which can consume several minutes.

In other instances, suppose that the start-stop command 202 instead requests that whichever of the set of software pods 106 that belong to the one or more namespaces 204 be stopped. In such case, the controller software pod 112 can identify which of the set of software pods 106 belong to the one or more namespaces 204, the controller software pod 112 can identify which of the set of replica cardinalities 110 correspond to those identified software pods, and the controller software pod 112 can set or configure those identified replica cardinalities to zero values.

As a non-limiting example, the start-stop command 202 can request that the software pod 106(*n*) be stopped. Accordingly, the controller software pod 112 can set or otherwise configure the replica cardinality 110(*n*) to zero. In response to such setting or configuration of the replica cardinality 110(*n*), the containerized software application 104 can automatically cease running all instantiations of the software pod 106(*n*), so as to be in accordance or compliance with the adjusted value of the replica cardinality 110(*n*). Note that such a soft-stop of the software pod 106(*n*) (e.g., scaling the replica cardinality 110(*n*) to zero and subsequently altering the number of running instantiations of the software pod 106(*n*)) can leave the software pod 106(*n*) installed on the hardware node 102, meaning that whatever container data or persistent volume data that is stored within the software pod 106(*n*) can remain preserved or otherwise not deleted. Contrast this with a hard stop (e.g., a full uninstallation) of the software pod 106(*n*), which can cause all the container data and persistent volume data that is stored within the software pod 106(*n*) to be deleted or otherwise lost.

In some embodiments, in response to determining that the start-stop command 202 is valid and before scaling or editing the set of replica cardinalities 110, the controller software pod 112 can perform installation checks for whichever of the set of software pods 106 belong to the one or more namespaces 204. If the controller software pod 112 determines that the software pods belonging to the one or more namespaces 204 are currently installed (e.g., have already been fully booted-from-scratch) on the hardware node 102, then the controller software pod 112 can adjust their replica cardinalities as mentioned above. However, if the controller software pod 112 determines that the software pods belonging to the one or more namespaces 204 are not currently installed (e.g., have not already been fully booted-from-scratch) on the hardware node 102, then the controller software pod 112 can install (e.g., boot-from-scratch) those software pods and subsequently adjust their replica cardinalities.

As a non-limiting example, suppose again that the start-stop command 202 requests that the software pod 106(1) be started. However, further suppose that the software pod 106(1) is not currently installed on the hardware node 102 (e.g., a legacy version of the containerized software application 104 can have been installed on the hardware node 102, and the software pod 106(1) might be a new or updated microservice that was not originally available with the legacy version). In such case, the controller software pod 112 can install (e.g., can boot-from-scratch) the software pod 106(1) on the hardware node 102. After installing the software pod 106(1), the controller software pod 112 can set or otherwise configure the replica cardinality 110(1) to any suitable non-zero value, as described above.

As another non-limiting example, suppose again that the start-stop command 202 requests that the software pod **106(*n*) be stopped. However, further suppose that the software pod 106(*n*) is not currently installed on the hardware node 102 (e.g., again, a legacy version of the containerized software application 104 can have been installed on the hardware node 102, and the software pod 106(*n*) might be a new or updated microservice that was not originally available with the legacy version). In such case, the controller software pod 112 can install (e.g., can boot-from-scratch) the software pod 106(*n*) on the hardware node 102. After installing the software pod 106(*n*), the controller software pod 112 can set or otherwise configure the replica cardinality 110(*n*)** to zero, as described above. Note that installing a software pod in response to a stop command can be considered as counterintuitive.

In some embodiments, the start-stop command 202 can explicitly request uninstallation or deletion of whichever of the set of software pods 106 belong to the one or more namespaces 204. In such cases, the controller software pod 112 can check whether the start-stop command 202 is valid, as mentioned above. If the start-stop command 202 is valid, the controller software pod 112 can check whether whichever of the set of software pods 106 that belong to the one or more namespaces 204 are already uninstalled from the hardware node 102. If whichever software pods that belong to the one or more namespaces 204 are already uninstalled, the controller software pod 112 can generate, transmit, or render any suitable notification indicating such to or on any suitable computing device or electronic display (not shown). However, if whichever software pods that belong to the one or more namespaces 204 are not already uninstalled (e.g., are currently installed), then the controller software pod 112 can soft-stop, rather than uninstall or delete, whichever software pods belong to the one or more namespaces 204. Similar to above, note that soft-stopping a software pod in response to an uninstallation command can be considered as counterintuitive. Indeed, the controller software pod 112 can, in such embodiments, be considered as disobeying the start-stop command 202. In various aspects, however, such disobedience can be considered as warranted. After all, the availability of soft-stopping can, in some instances, be considered as eliminating any need for full uninstallations or deletions (e.g., soft-stopping can cease execution of a pod without losing the persistent volume data of that pod, unlike uninstallation or deletion). Accordingly, if the start-stop command 202 requests uninstallation, the controller software pod 112 can, in some embodiments, refrain from performing such uninstallation and can instead perform soft-stops. In this way, the controller software pod 112 can be considered as automatically protecting the containerized software application 104 from potentially mistaken or potentially malicious uninstallation commands.

Figure 3:
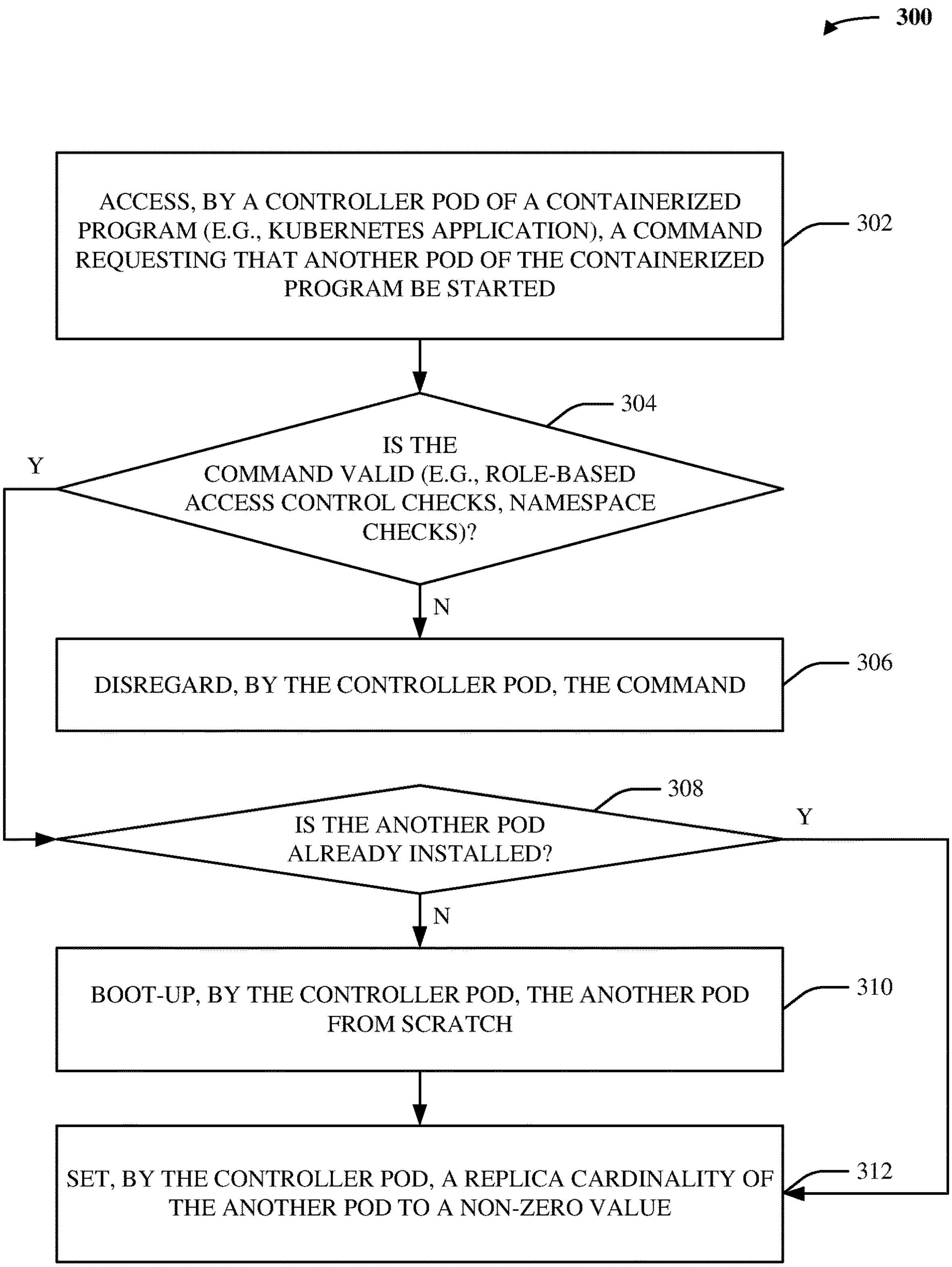
FIGS. 3-5 illustrate flow diagrams of example, non-limiting computer-implemented methods that facilitate scaling or editing replica cardinalities in response to start-stop commands in accordance with one or more embodiments described herein.
Figure 4:
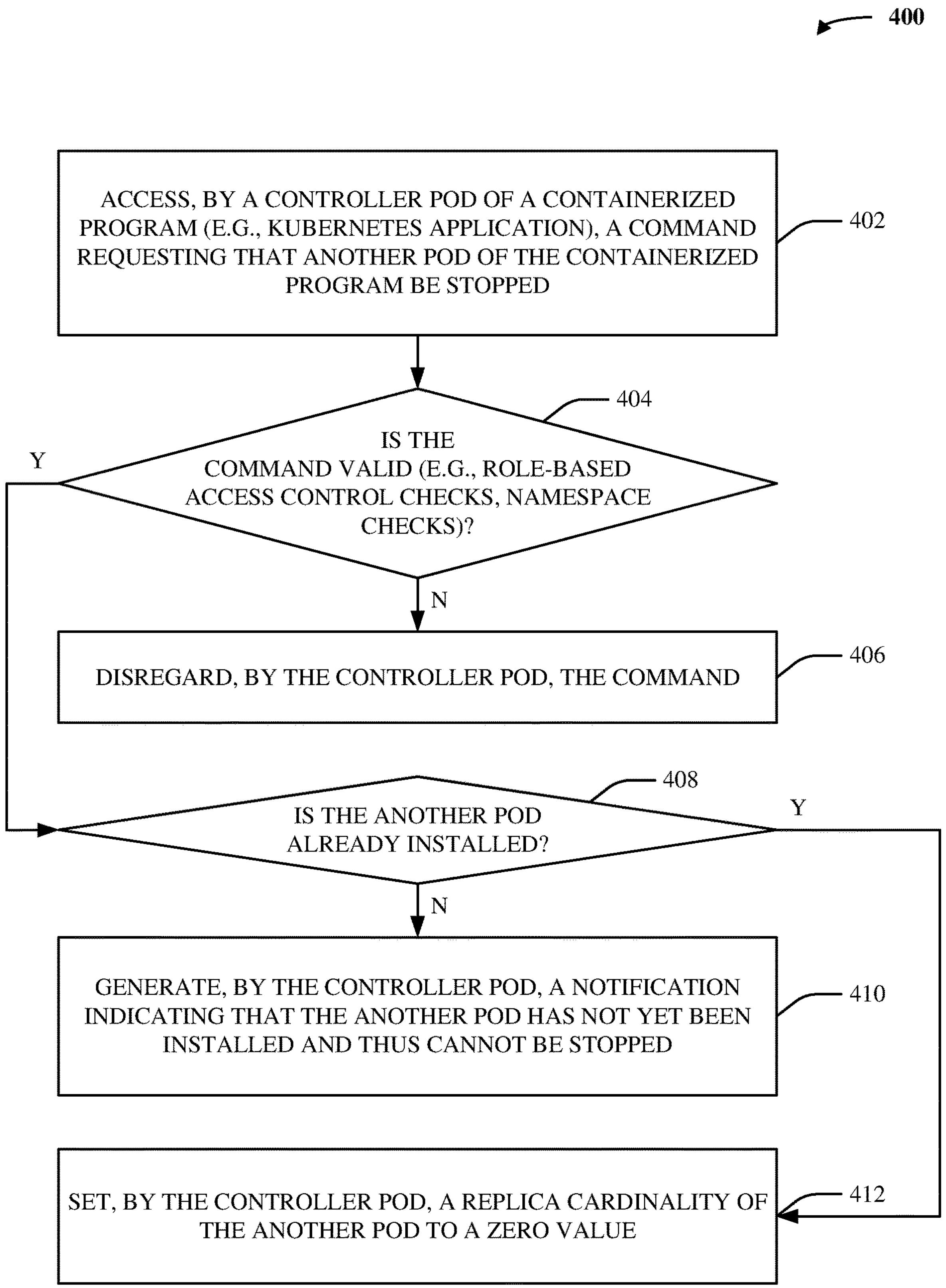
Figure 5:
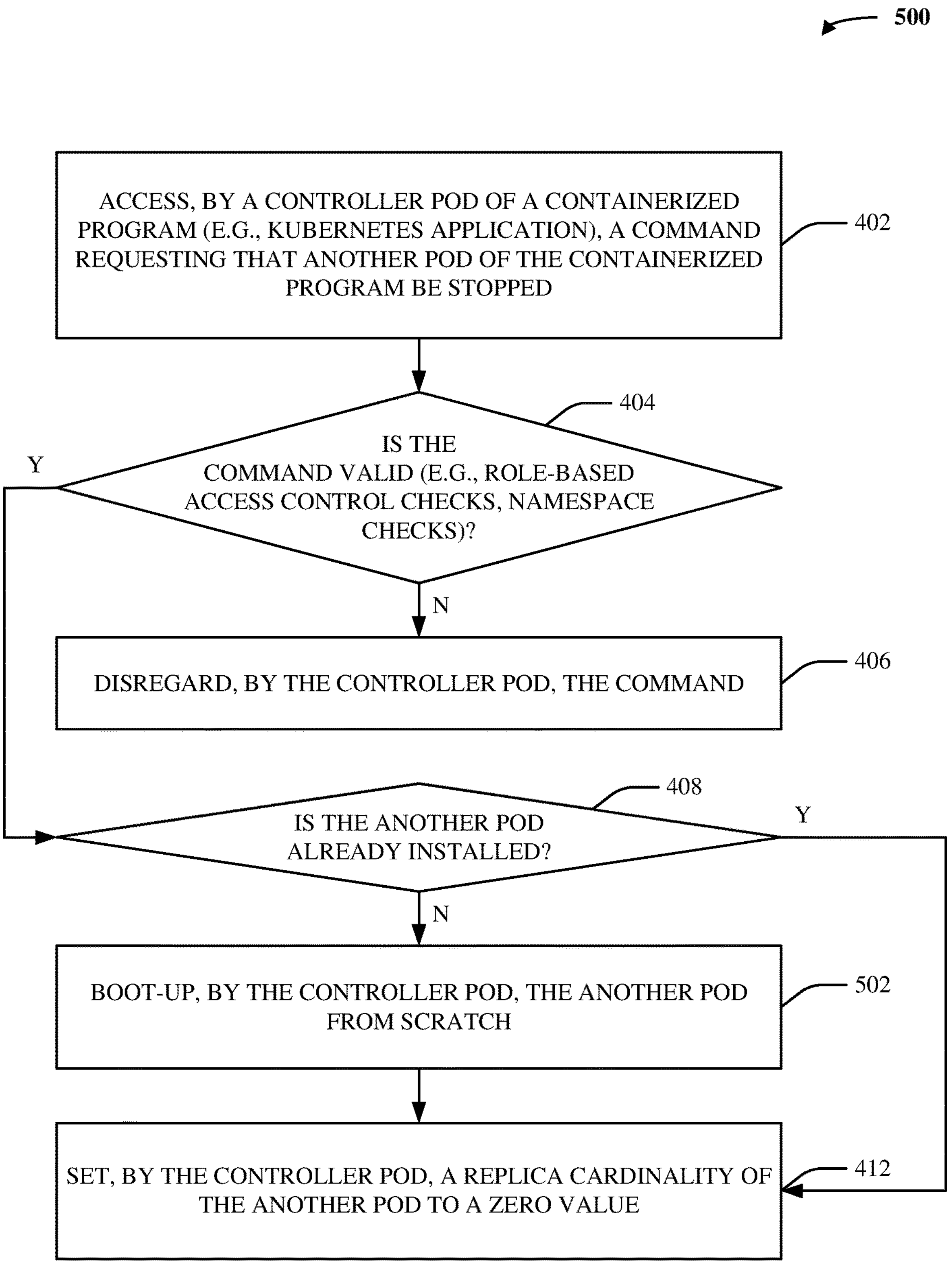

FIGS. 3-5 illustrate flow diagrams of example, non-limiting computer-implemented methods 300, 400, and 500 that can facilitate scaling or editing replica cardinalities in response to start-stop commands in accordance with one or more embodiments described herein.

First, consider FIG. 3. In various embodiments, act 302 can include accessing, by a controller pod (e.g., 112) of a containerized program (e.g., 104), a command (e.g., 202) requesting that another pod (e.g., 106(1)) of the containerized program be started. In various cases, as mentioned above, the containerized program can be orchestrated via Kubernetes.

In various aspects, act 304 can include determining, by the controller pod, whether the command is valid. In some cases, this can include performing, by the controller pod, any suitable role-based access control checks or any suitable namespace validation checks on the command. If the controller pod determines that the command is invalid, then the computer-implemented method 300 can proceed to act 306. On the other hand, if the controller pod determines that the command is valid, then the computer-implemented method 300 can instead proceed to act 308.

In various instances, act 306 can include disregarding, by the controller pod, the command. In some cases, this can include generating any suitable invalidity notification, transmitting such invalidity notification to any suitable computing device, or rendering such invalidity notification on any suitable electronic display (e.g., computer screen, computer monitor).

In various aspects, act 308 can include determining, by the controller pod, whether the another pod (e.g., as specified or identified in the command) is already installed. If so (e.g., if the another pod is already installed), the computer-implemented method 300 can proceed to act 312. If not (e.g., if the another pod is not already installed), the computer-implemented method 300 can instead proceed to act 310.

In various instances, act 310 can include booting-up, by the controller pod, the another pod from scratch. In various cases, this can involve performing an EML start with respect to the another pod. After such boot-up, the computer-implemented method 300 can then proceed to act 312.

In various aspects, act 312 can include setting, by the controller pod, a replica cardinality (e.g., 106(1)) of the another pod to a non-zero value. In various cases, this can be considered as soft-starting the another pod (e.g., as ensuring that a non-zero number of instantiations of the another pod are being run by the containerized program).

Next, consider FIG. 4. In various embodiments, act 402 can include accessing, by a controller pod (e.g., 112) of a containerized program (e.g., 104), a command (e.g., 202) requesting that another pod (e.g., **106(*n*)**) of the containerized program be stopped. In various cases, as mentioned above, the containerized program can be orchestrated via Kubernetes.

In various aspects, act 404 can include determining, by the controller pod, whether the command is valid. Just as above, this can include performing, by the controller pod, any suitable role-based access control checks or any suitable namespace validation checks on the command. If the controller pod determines that the command is invalid, then the computer-implemented method 400 can proceed to act 406. On the other hand, if the controller pod determines that the command is valid, then the computer-implemented method 400 can instead proceed to act 408.

In various instances, act 406 can include disregarding, by the controller pod, the command. As mentioned above, this can include generating any suitable invalidity notification, transmitting such invalidity notification to any suitable computing device, or rendering such invalidity notification on any suitable electronic display (e.g., computer screen, computer monitor).

In various aspects, act 408 can include determining, by the controller pod, whether the another pod (e.g., as specified or identified in the command) is already installed. If so (e.g., if the another pod is already installed), the computer-implemented method 400 can proceed to act 412. If not (e.g., if the another pod is not already installed), the computer-implemented method 400 can instead proceed to act 410.

In various instances, act 410 can generating, by the controller pod, a notification indicating that the another pod has not yet been installed and thus cannot be stopped. In some cases, the controller pod can transmit such notification to any suitable computing device or can render such notification on any suitable electronic display.

In various aspects, act 412 can include setting, by the controller pod, a replica cardinality (e.g., 106(*n*)) of the another pod to a zero value. In various cases, this can be considered as soft-stopping the another pod (e.g., as ensuring that zero instantiations of the another pod are being run by the containerized program).

Now, consider FIG. 5. As shown, FIG. 5 can include acts 402, 404, 406, 408, and 412, as described above. However, instead of act 410, the computer-implemented method 500 can have act 502. In various aspects, act 502 can include booting-up, by the controller pod, the another pod from scratch. As above, this can involve performing an EML start with respect to the another pod. After such boot-up, the computer-implemented method 500 can then proceed to act 412.

Figure 6:
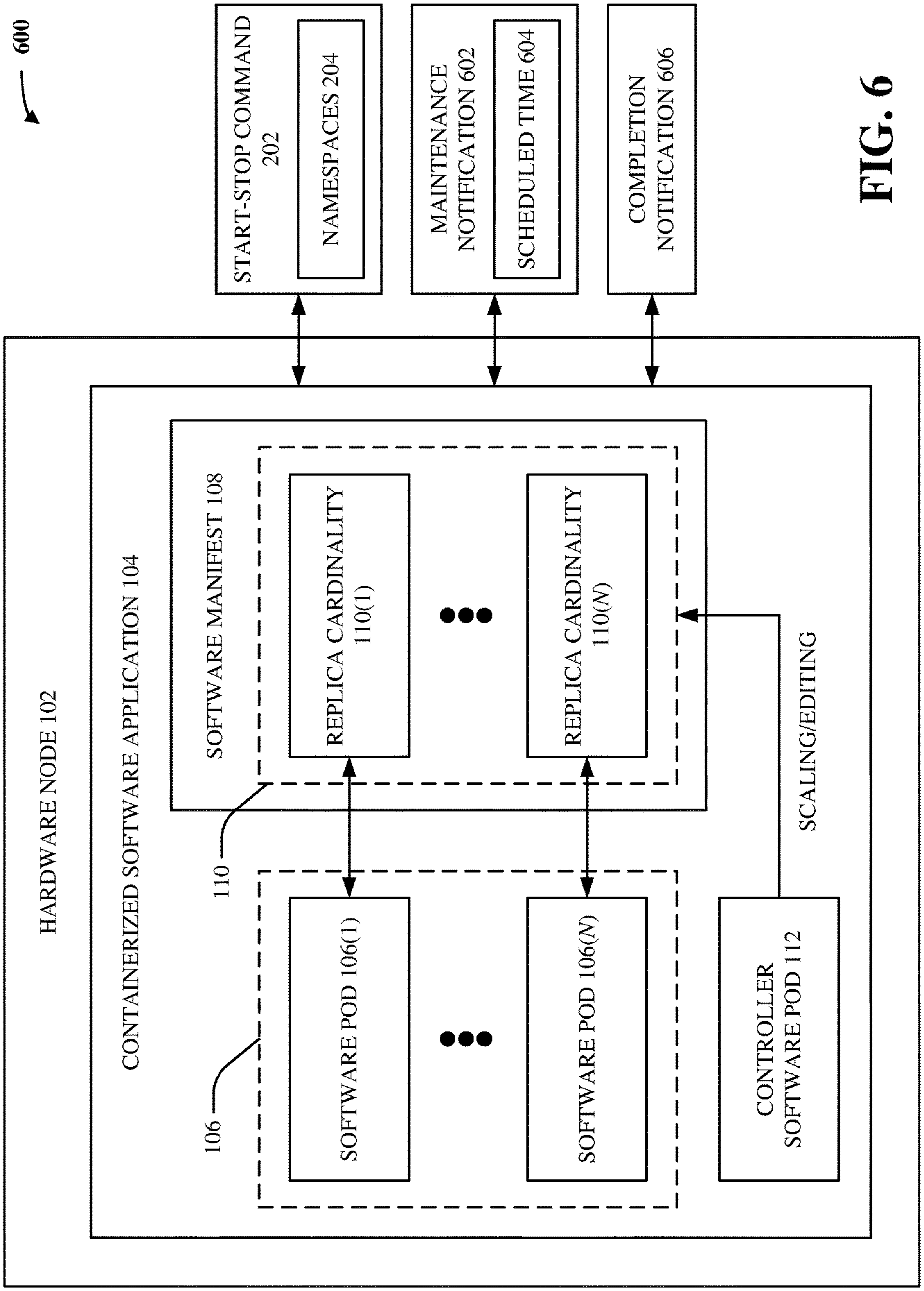
FIG. 6 illustrates a block diagram of an example, non-limiting system including scheduled maintenance notifications that facilitates improved start and stop of containerized applications in accordance with one or more embodiments described herein.

FIG. 6 illustrates a block diagram of an example, non-limiting system 600 including scheduled maintenance notifications that can facilitate improved start and stop of containerized applications in accordance with one or more embodiments described herein. As shown, the system 600 can, in some cases, comprise the same components as the system 200, and can further comprise a maintenance notification 602 and a completion notification 606.

In various embodiments, the controller software pod 112 can electronically receive or otherwise electronically access the maintenance notification 602. In various aspects, a user associated with the hardware node 102 or with the containerized software application 104 can create the maintenance notification 602 by interacting with any suitable user-interface (e.g., keyboard, keypad, touch screen, voice command) of the hardware node 102. In other aspects, the maintenance notification 602 can be automatically generated by any suitable computing system that is configured to monitor the hardware node 102. In still other aspects, the maintenance notification 602 can be automatically generated by the hardware node 102 itself.

In any case, the maintenance notification 602 can be any suitable electronic message that can specify a scheduled time 604. In various instances, the scheduled time 604 can be a future time or date (e.g., as indicated via year, month, day, hour, minute, or second) at which maintenance is planned, scheduled, or recommended to be performed on the hardware node 102. Non-limiting examples of such maintenance can be repair of the hardware node 102, recalibration of the hardware node 102, or updating of the hardware node 102. In various cases, such maintenance of the hardware node 102 can be properly performed when the set of software pods 106 are stopped and not when the set of software pods 106 are started or running.

In various aspects, the controller software pod 112 can perform any suitable verification checks on the maintenance notification 602. As a non-limiting example, the controller software pod 112 can perform any suitable role-based access control checks on the maintenance notification 602. If the maintenance notification 602 passes or satisfies such verification checks, the controller software pod 112 can determine that the maintenance notification 602 is valid. On the other hand, if the maintenance notification 602 fails to pass or satisfy such verification checks, the controller software pod 112 can determine that the maintenance notification 602 is invalid.

In various instances, in response to determining that the maintenance notification 602 is invalid, the controller software pod 112 can ignore or otherwise disregard the maintenance notification 602. In various other instances, in response to determining that the maintenance notification 602 is invalid, the controller software pod 112 can generate, transmit, or render any suitable warning or invalidity notification to or on any suitable computing device or electronic display (not shown). However, in response to determining that the maintenance notification 602 is valid, the controller software pod 112 can, at or within any suitable time window prior to the scheduled time 604, scale or otherwise configure all of the set of replica cardinalities 110 to zero (or at least whichever of the set of replica cardinalities 110 correspond to currently installed software pods). In other words, the controller software pod 112 can respond to the maintenance notification 602 by soft-stopping (rather than hard-stopping) all of the set of software pods 106 (or at least whichever of the set of software pods 106 are currently installed) at or before the scheduled time 604, thereby permitting maintenance to be properly performed on the hardware node 102 at the scheduled time 604.

In various embodiments, after performance of such maintenance on the hardware node 102, the controller software pod 112 can electronically receive or otherwise electronically access the completion notification 606. In various aspects, a user associated with the hardware node 102 or with the containerized software application 104 can create the completion notification 606 by interacting with any suitable user-interface (e.g., keyboard, keypad, touch screen, voice command) of the hardware node 102. In other aspects, the completion notification 606 can be automatically generated by any suitable computing system that is configured to monitor the hardware node 102. In still other aspects, the completion notification 606 can be automatically generated by the hardware node 102 itself.

In any case, the completion notification 606 can be any suitable electronic message that can indicate or otherwise specify that the scheduled maintenance associated with the maintenance notification 602 has been finished or completed with respect to the hardware node 102. In other words, the completion notification 606 can be considered as indicating that it is now permissible to again start the set of software pods 106.

In various aspects, the controller software pod 112 can perform any suitable verification checks on the completion notification 606. As a non-limiting example, the controller software pod 112 can perform any suitable role-based access control checks on the completion notification 606. If the completion notification 606 passes or satisfies such verification checks, the controller software pod 112 can determine that the completion notification 606 is valid. On the other hand, if the completion notification 606 fails to pass or satisfy such verification checks, the controller software pod 112 can determine that the completion notification 606 is invalid.

In various instances, in response to determining that the completion notification 606 is invalid, the controller software pod 112 can ignore or otherwise disregard the completion notification 606. In various other instances, in response to determining that the completion notification 606 is invalid, the controller software pod 112 can generate, transmit, or render any suitable warning or invalidity notification to or on any suitable computing device or electronic display (not shown). However, in response to determining that the completion notification 606 is valid, the controller software pod 112 can scale or otherwise configure all of the set of replica cardinalities 110 (or at least whichever of the set of replica cardinalities 110 correspond to currently installed software pods) to any suitable non-zero values (e.g., any suitable positive integer values). In other words, the controller software pod 112 can respond to the completion notification 606 by soft-starting (rather than hard-starting) all of the set of software pods 106 (or at least whichever of the set of software pods 106 are currently installed).

In various aspects, the controller software pod 112 can continuously, continually, or otherwise periodically check for such maintenance notifications and completion notifications. In this way, the controller software pod 112 can be considered as automatically preparing the containerized software application 104 for maintenance that is planned or scheduled to be performed on the hardware node 102.

Figure 7:
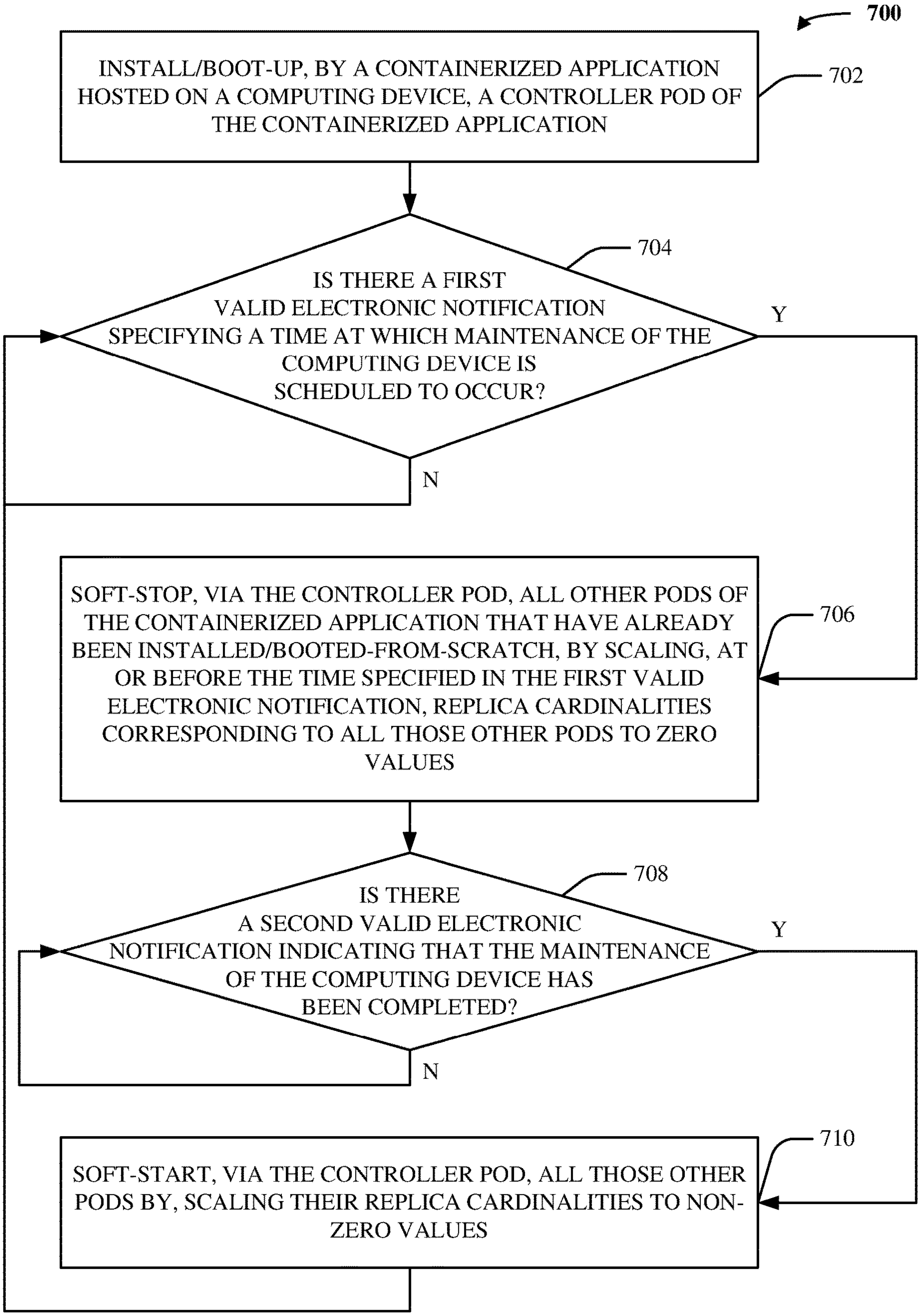
FIG. 7 illustrates a flow diagram of an example, non-limiting computer-implemented method that facilitates scaling or editing of replica cardinalities in response to scheduled maintenance notifications in accordance with one or more embodiments described herein.

FIG. 7 illustrates a flow diagram of an example, non-limiting computer-implemented method 700 that can facilitate scaling or editing of replica cardinalities in response to scheduled maintenance notifications in accordance with one or more embodiments described herein.

In various embodiments, act 702 can include installing or booting-up, by a containerized application (e.g., 104) hosted on a computing device (e.g., 102), a controller pod (e.g., 112) of the containerized application.

In various aspects, act 704 can include determining, by the controller pod, whether there is a first valid electronic notification (e.g., 602) specifying a time (e.g., 604) at which maintenance of the computing device is scheduled to occur. If not (e.g., if there is not any such valid electronic notification), the computer-implemented method 700 can proceed back to act 704. If so (e.g., if there is such a valid electronic notification), the computer-implemented method 700 can instead proceed to act 706. In other words, the controller pod can continually or periodically check for such a valid electronic notification.

In various instances, act 706 can include soft-stopping, by the controller pod, all other pods (e.g., 106) of the containerized application that have already been installed or otherwise booted-from-scratch. In various cases, this can involve scaling, by the controller pod, at or before the time specified in the first valid electronic notification, replica cardinalities (e.g., 110) corresponding to all those other pods to zero values.

In various cases, act 708 can include determining, by the controller pod, whether there is a second valid electronic notification (e.g., 606) indicating that the maintenance of the computing device has been completed. If not (e.g., if there is no such valid electronic notification), then the computer-implemented method 700 can proceed back to act 708. If so (e.g., if there is such a valid electronic notification), then the computer-implemented method 700 can instead proceed to act 710. In other words, the controller pod can continually or periodically check for such a valid electronic notification.

In various aspects, act 710 can include soft-starting, by the controller pod, all those other pods (e.g., 106). This can include scaling, by the controller pod, the replica cardinalities (e.g., 110) of all those other pods to non-zero values. As shown, the computer-implemented method 700 can then proceed back to act 704.

Figure 8:
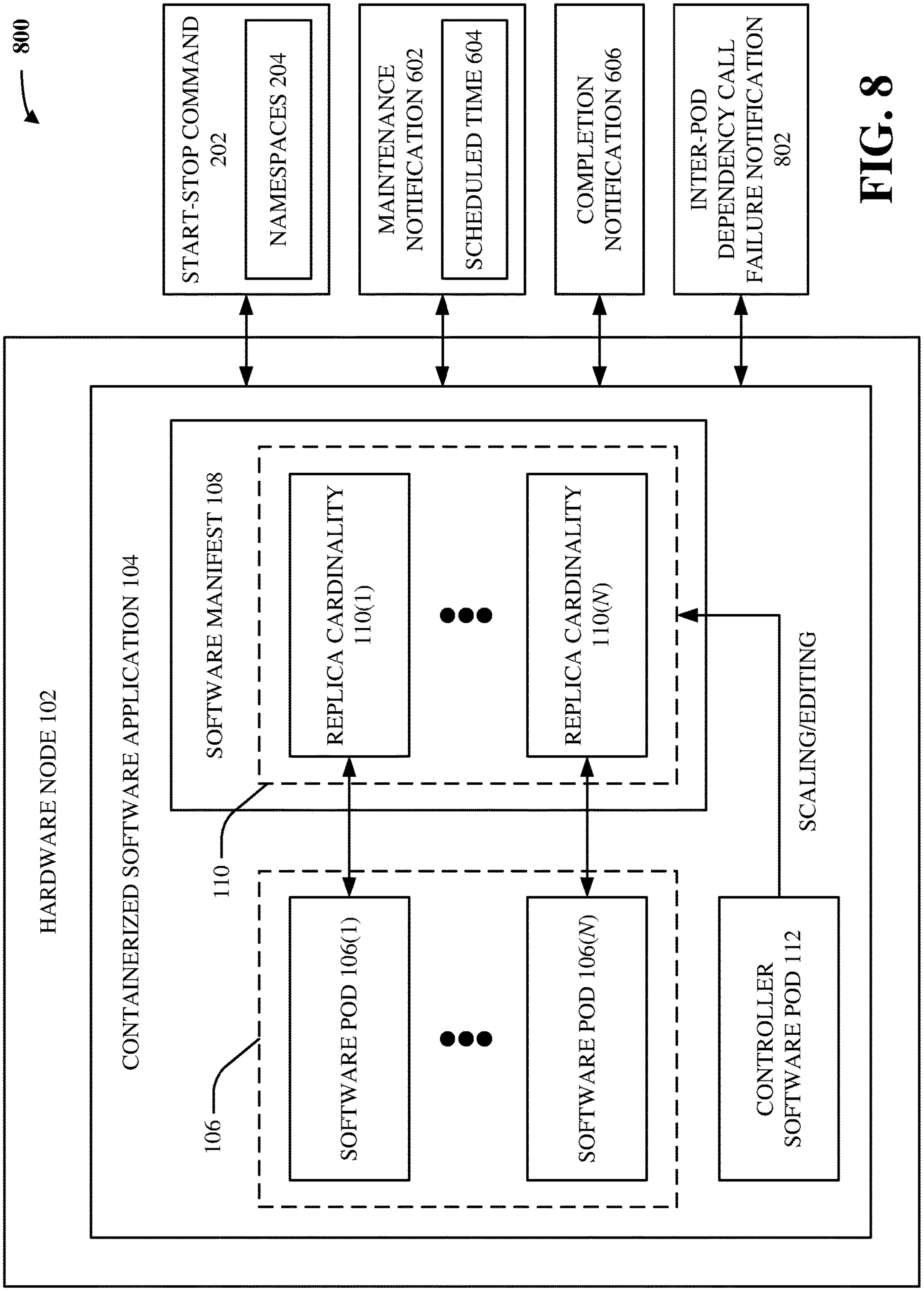
FIG. 8 illustrates a block diagram of an example, non-limiting system including an inter-pod dependency call failure notification that facilitates improved start and stop of containerized applications in accordance with one or more embodiments described herein.

FIG. 8 illustrates a block diagram of an example, non-limiting system 800 including an inter-pod dependency call failure notification that can facilitate improved start and stop of containerized applications in accordance with one or more embodiments described herein. As shown, the system 800 can, in some cases, comprise the same components as the system 600, and can further comprise an inter-pod dependency call failure notification 802.

In various embodiments, the controller software pod 112 can electronically receive or otherwise electronically access the inter-pod dependency call failure notification 802. In various aspects, a first software pod in the set of software pods 106 can depend upon a second software pod in the set of software pods 106. In other words, the first software pod can, while operating, running, or otherwise executing, call or invoke the second software pod. In some instances, it can be possible that such call or invocation fails. That is, it can be possible for the second software pod to not respond to the call or invocation made by the first software pod. In response to the failure of such call or invocation, the first software pod can generate the inter-pod dependency call failure notification 802. In various aspects, the inter-pod dependency call failure notification 802 can be any suitable electronic message that can specify or otherwise indicate that the second software pod failed to respond to the call or invocation by the first software pod.

In various aspects, the controller software pod 112 can perform any suitable verification checks or security checks on the inter-pod dependency call failure notification 802. If the inter-pod dependency call failure notification 802 passes or satisfies such verification or security checks, the controller software pod 112 can determine that the inter-pod dependency call failure notification 802 is valid. On the other hand, if the inter-pod dependency call failure notification 802 fails to pass or satisfy such verification or security checks, the controller software pod 112 can determine that the inter-pod dependency call failure notification 802 is invalid.

In various instances, in response to determining that the inter-pod dependency call failure notification 802 is invalid, the controller software pod 112 can ignore or otherwise disregard the inter-pod dependency call failure notification 802. In various other instances, in response to determining that the inter-pod dependency call failure notification 802 is invalid, the controller software pod 112 can generate, transmit, or render any suitable warning or invalidity notification to or on any suitable computing device or electronic display (not shown). However, in response to determining that the inter-pod dependency call failure notification 802 is valid, the controller software pod 112 can soft-start the second software pod by scaling or setting its replica cardinality to non-zero, and the controller software pod 112 can then instruct the first software pod to retry its call or invocation to the second software pod.

In some cases, in response to determining that the inter-pod dependency call failure notification 802 is valid, the controller software pod 112 can determine whether the second software pod is currently installed on the hardware node 102. If the second software pod is currently installed, the controller software pod 112 can scale the replica cardinality of the second software pod to non-zero and can instruct the first software pod to retry its call or invocation, as mentioned above. However, if the second software pod is not currently installed, then the controller software pod 112 can install (e.g., fully boot-from-scratch) the second software pod, and the controller software pod 112 can then scale the replica cardinality of the second software pod to non-zero and can instruct the first software pod to retry its call or invocation.

In any case, by soft-starting the second software pod in response to the inter-pod dependency call failure notification 802, the controller software pod 112 can be considered as automatically attempting to cure or otherwise resolve the failed dependency call.

Figure 9:
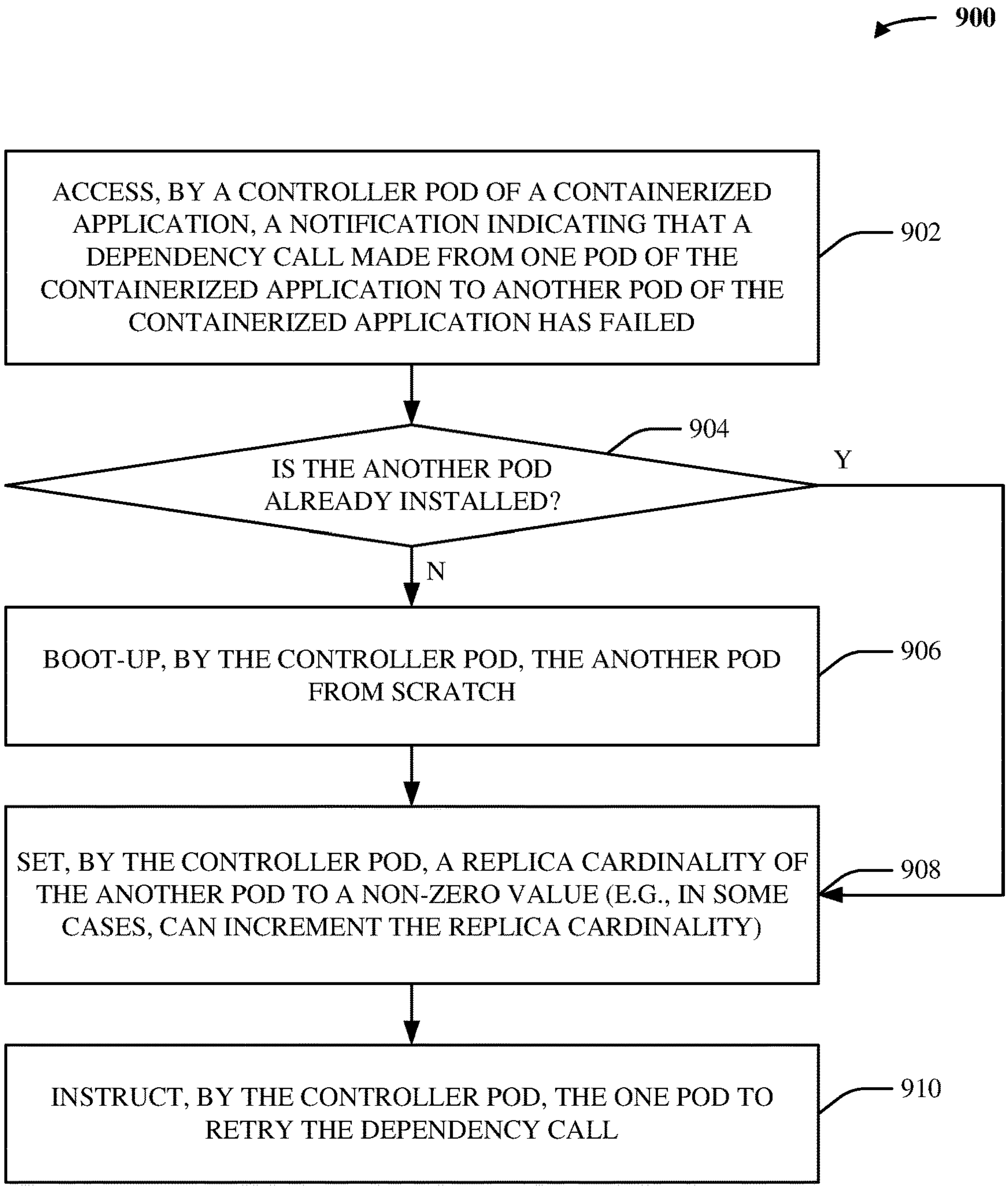
FIG. 9 illustrates a flow diagram of an example, non-limiting computer-implemented method that facilitates scaling or editing of replica cardinalities in response to failed dependency calls in accordance with one or more embodiments described herein.

FIG. 9 illustrates a flow diagram of an example, non-limiting computer-implemented method 900 that can facilitate scaling or editing of replica cardinalities in response to failed dependency calls in accordance with one or more embodiments described herein.

In various embodiments, act 902 can include accessing, by a controller pod (e.g., 112) of a containerized application (e.g., 104), a notification (e.g., 802) indicating that a dependency call made from one pod (e.g., one of 106) of the containerized application to another pod (e.g., another of 106) of the containerized application has failed.

In various aspects, act 904 can include determining, by the controller pod, whether the another pod is already installed. If not (e.g., if the another pod has not already been installed or fully booted-from-scratch), then the computer-implemented method 900 can proceed to act 906. If so (e.g., if the another pod has already been installed or fully booted-from-scratch), then the computer-implemented method 900 can instead proceed to act 908.

In various instances, act 906 can include booting-up, by the controller pod, the another pod from scratch. As mentioned above, this can involve performing an EML start with respect to the another pod. After such boot-up, the computer-implemented method 900 can then proceed to act 908.

In various cases, act 908 can include setting, by the controller pod, a replica cardinality (e.g., one of 110) of the another pod to a non-zero value. In some aspects, this can include incrementing, by the controller pod, the replica cardinality of the another pod.

In various instances, act 910 can include instructing, by the controller pod, the one pod to retry the dependency call to the another pod.

FIGS. 10-11 illustrate flow diagram of example, non-limiting computer-implemented methods 1000 and 1100 that can facilitate improved start and stop of containerized applications in accordance with one or more embodiments described herein.

First, consider FIG. 10. In various embodiments, act 1002 can include accessing, by a controller software pod (e.g., 112) of a containerized software application (e.g., 104), an electronic command (e.g., 202) requesting that a plurality of first software pods (e.g., 106) of the containerized software application be started or stopped. In various cases, the containerized software application can include a software manifest (e.g., 108) which can specify a plurality of replica cardinalities (e.g., 110) to be respectively satisfied by the plurality of first software pods In various aspects, act 1004 can include responding, by the controller software pod, to the electronic command by editing the plurality of replica cardinalities. In various instances, the electronic command can request that the plurality of first software pods be started, and the controller software pod can edit the plurality of replica cardinalities by scaling the plurality of replica cardinalities from zero values to non-zero values. In various other instances, the electronic command can request that the plurality of first software pods be stopped, and the controller software pod can edit the plurality of replica cardinalities by scaling the plurality of replica cardinalities from non-zero values to zero values.

Although not explicitly shown in FIG. 10, the computer-implemented method 1000 can comprise: verifying, by the controller software pod, that the electronic command is valid (e.g., as shown by 304 and 404).

Although not explicitly shown in FIG. 10, the controller software pod can edit fewer than all of the plurality of replica cardinalities, based on a namespace filter (e.g., 204) in the electronic command identifying fewer than all of the plurality of first software pods.

Now, consider FIG. 11. In various embodiments, act 1102 can include accessing, by a controller software pod (e.g., 112) of a containerized software application (e.g., 104) hosted on a computing device (e.g., 102), a first electronic notification (e.g., 602) indicating a scheduled time (e.g., 604) at which maintenance is to be performed on the computing device.

In various aspects, act 1104 can include, scaling, by the controller software pod and in response to the first electronic notification, replica cardinalities (e.g., 110) corresponding to all other software pods (e.g., 106) of the containerized software application to zero values at or before the scheduled time (e.g., as shown by 706).

Although not explicitly shown in FIG. 11, the computer-implemented method 1100 can comprise: verifying, by the controller software pod, that the first electronic notification is valid.

Although not explicitly shown in FIG. 11, the computer-implemented method 1100 can comprise: accessing, by the controller software pod, a second electronic notification (e.g., 606) indicating that the maintenance of the computing device has been completed; and scaling, by the controller software pod and in response to the second electronic notification, the replica cardinalities corresponding to all the other software pods of the containerized software application to non-zero values (e.g., as shown by 710).

Although not explicitly shown in FIG. 11, the computer-implemented method 1100 can comprise: verifying, by the controller software pod, that the second electronic notification is valid.

As described herein, the controller software pod 112 can be considered as an independent microservice deployed within the containerized software application 104, where such independent microservice can orchestrate or otherwise handle starting and stopping of software pods (e.g., 106) by making edits to the replica cardinalities (e.g., 110) of those software pods. In some embodiments, the controller software pod 112 can perform soft-starts or soft-stops in response to user input (e.g., 202). In other embodiments, the controller software pod 112 can automatically perform soft-stops in preparation for scheduled maintenance (e.g., as indicated by 602) of the hardware node 102 and can automatically perform soft-starts following the completion of such scheduled maintenance (e.g., as indicated by 606). In yet other embodiments, the controller software pod 112 can automatically perform soft-starts on software pods that have failed to respond to dependency calls (e.g., as indicated by 802). However, these are mere non-limiting examples for ease of illustration and explanation. In various other embodiments, the controller software pod 112 can perform soft-starts or soft-stops on any of the set of software pods 106 in response to any suitable types of electronic triggers. In any case, by performing soft-starts instead of hard-starts, the controller software pod 112 can help to reduce a cumulative amount of boot-up time associated with the containerized software application 104. Similarly, by performing soft-stops instead of hard-stops, the controller software pod 112 can help to preserve or otherwise protect persistent volume data of the containerized software application 104 from being lost or deleted. Accordingly, the controller software pod 112 certainly constitutes a useful and practical application of computers.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by f(z)=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 12:
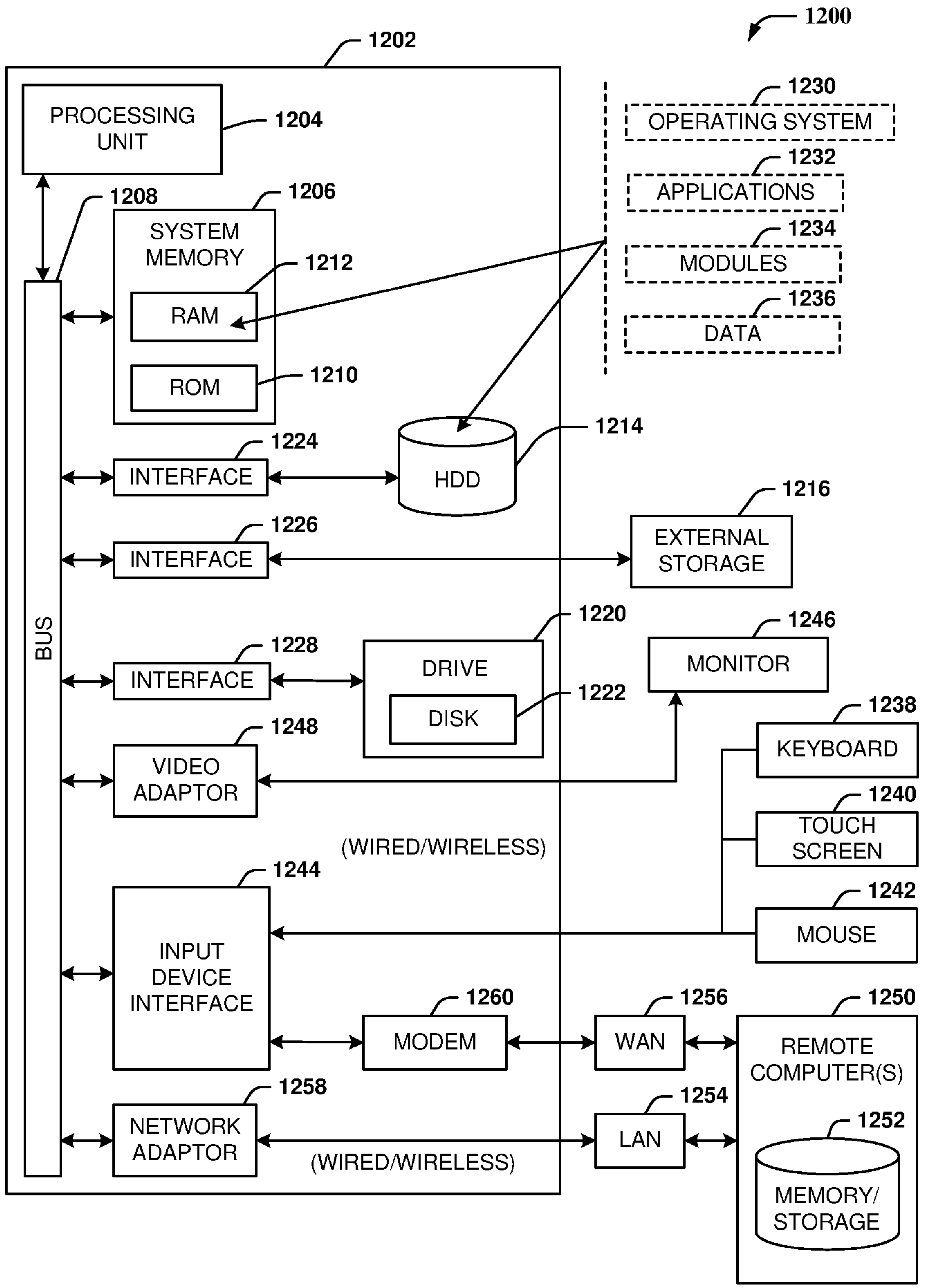
FIG. 12 illustrates a block diagram of an example, non-limiting operating environment in which one or more embodiments described herein can be facilitated.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms “tangible” or “non-transitory” herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term “modulated data signal” or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
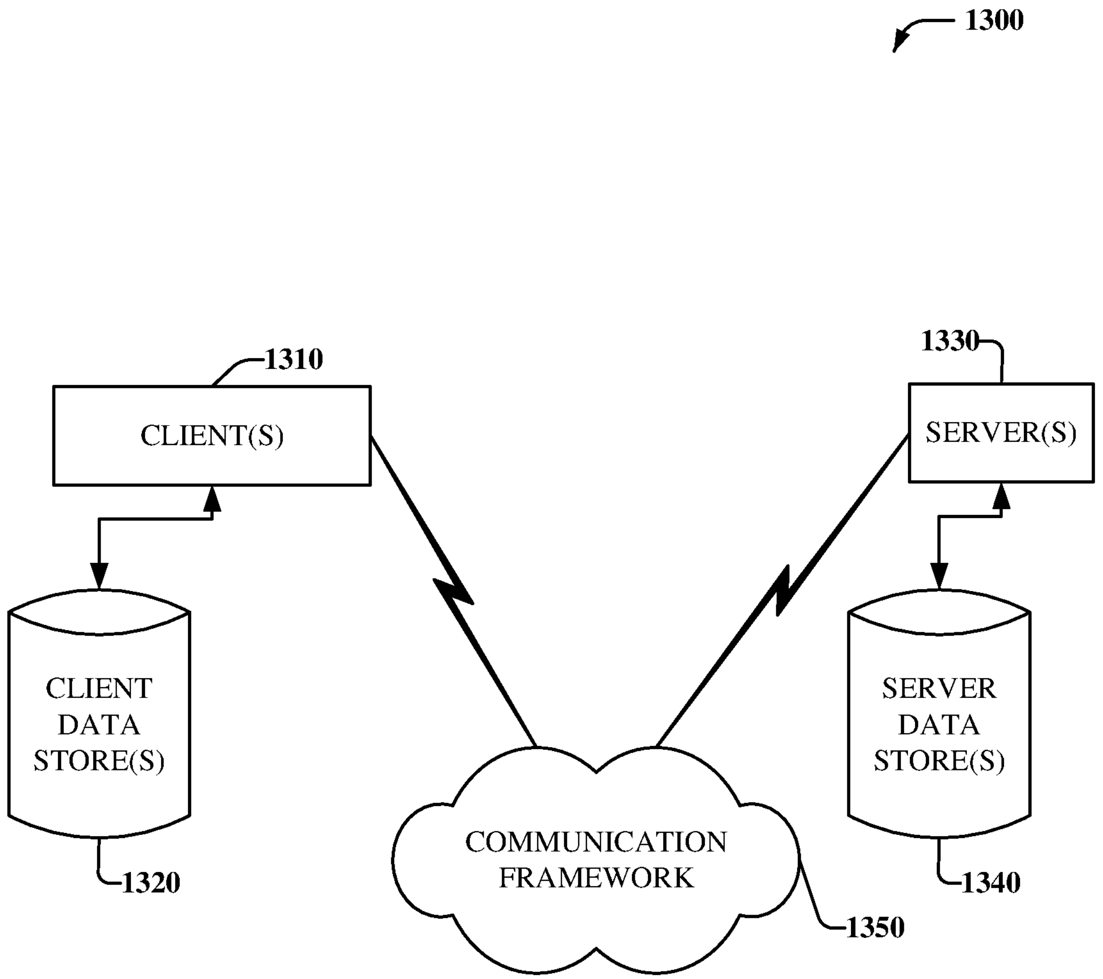
FIG. 13 illustrates an example networking environment operable to execute various implementations described herein.

FIG. 13 is a schematic block diagram of a sample computing environment 1300 with which the disclosed subject matter can interact. The sample computing environment 1300 includes one or more client(s) 1310. The client(s) 1310 can be hardware or software (e.g., threads, processes, computing devices). The sample computing environment 1300 also includes one or more server(s) 1330. The server(s) 1330 can also be hardware or software (e.g., threads, processes, computing devices). The servers 1330 can house threads to perform transformations by employing one or more embodiments as described herein, for example. One possible communication between a client 1310 and a server 1330 can be in the form of a data packet adapted to be transmitted between two or more computer processes. The sample computing environment 1300 includes a communication framework 1350 that can be employed to facilitate communications between the client(s) 1310 and the server(s) 1330. The client(s) 1310 are operably connected to one or more client data store(s) 1320 that can be employed to store information local to the client(s) 1310. Similarly, the server (s) 1330 are operably connected to one or more server data store(s) 1340 that can be employed to store information local to the servers 1330.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," ""data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

accessing, by a controller software pod of a containerized software application hosted on a computing device, a first electronic notification indicating a scheduled time at which maintenance is to be performed on the computing device;

in response to the first electronic notification, editing, by the controller software pod, respective replica cardinalities corresponding to all other software pods of the containerized software application to zero values at or before the scheduled time, wherein the respective replica cardinalities are in a software manifest of the containerized software application, and, wherein the respective replica cardinalities indicate respective quantities of instances of the other software pods to run; and based on the editing the respective replica cardinalities to zero values, soft-stopping, by the containerized software application, all instances of the other software pods, wherein the containerized software application retains data stored within previously running instances of the other software pods that were soft-stopped based on the edited respective replica cardinalities.

2. The computer-implemented method of claim 1, further comprising:

prior to the editing the respective replica cardinalities to zero values, verifying, by the controller software pod, that the first electronic notification is valid.

3. The computer-implemented method of claim 1, further comprising:

accessing, by the controller software pod, a second electronic notification indicating that the maintenance of the computing device has been completed;

in response to the second electronic notification, editing, by the controller software pod, the respective replica cardinalities corresponding to all of the other software pods of the containerized software application to non-zero values; and based on the editing the respective replica cardinalities to non-zero values, soft-starting, by the containerized software application, one or more instances of the at least one of the other software pods using the retained data from the previously running instances of the other software pods that were soft-stopped.

4. The computer-implemented method of claim 3, further comprising:

prior to the editing the respective replica cardinalities to non-zero values, verifying, by the controller software pod, that the second electronic notification is valid.

5. The computer-implemented method of claim 1, wherein the containerized software application is a medical imaging program, and wherein the computing device is a medical imaging scanner.

6. The computer-implemented method of claim 1, wherein the containerized software application is implemented via Kubernetes, and wherein the replica cardinalities are specified in a deployment or StatefulSet of the containerized software application.

7. The computer-implemented method of claim 1, wherein the containerized software application is a self-driving program, and wherein the computing device is a vehicle-integrated computer.

8. A system, comprising:

a memory configured to store computer-executable instructions; and a processor configured to execute at least one of the computer-executable instructions that:

accesses, by a controller software pod of a containerized software application hosted on the system, a first electronic notification indicating a scheduled time at which maintenance is to be performed on the system;

in response to the first electronic notification, edits, by the controller software pod, respective replica cardinalities corresponding to all other software pods of the containerized software application to zero values at or before the scheduled time, wherein the respective replica cardinalities are in a software manifest of the containerized software application, and, wherein the respective replica cardinalities indicate respective quantities of instances of the other software pods to run; and based on the editing the respective replica cardinalities to zero values, soft-stops, by the containerized software application, all instances of the other software pods, wherein the containerized software application retains data stored within previously running instances of the other software pods that were soft-stopped based on the edited respective replica cardinalities.

9. The system of claim 8, wherein the at least one of the computer-executable instructions further:

prior to the editing the respective replica cardinalities to zero values, verifies, by the controller software pod, that the first electronic notification is valid.

10. The system of claim 8, wherein the at least one of the computer-executable instructions further:

accesses, by the controller software pod, a second electronic notification indicating that the maintenance of the system has been completed;

in response to the second electronic notification, edits, by the controller software pod, the respective replica cardinalities corresponding to all of the other software pods of the containerized software application to non-zero values; and based on the editing the respective replica cardinalities to non-zero values, soft-starts, by the containerized software application, one or more instances of the at least one of the other software pods using the retained data from the previously running instances of the other software pods that were soft-stopped.

11. The system of claim 10, wherein the at least one of the computer-executable instructions further:

prior to the editing the respective replica cardinalities to non-zero values, verifies, by the controller software pod, that the second electronic notification is valid.

12. The system of claim 8, wherein the containerized software application is a medical imaging program, and wherein the system comprises a medical imaging scanner.

13. The system of claim 8, wherein the containerized software application is implemented via Kubernetes, and wherein the replica cardinalities are specified in a deployment or StatefulSet of the containerized software application.

14. The system of claim 8, wherein the containerized software application is a self-driving program, and wherein the system comprises a vehicle-integrated computer.

15. A non-transitory computer-readable medium having instructions stored thereon that, in response to execution, cause a system comprising a processor to perform operations comprising:

accessing, by a controller software pod of a containerized software application hosted on the system, a first electronic notification indicating a scheduled time at which maintenance is to be performed on the system;

in response to the first electronic notification, editing, by the controller software pod, respective replica cardinalities corresponding to all other software pods of the containerized software application to zero values at or before the scheduled time, wherein the respective replica cardinalities are in a software manifest of the containerized software application, and, wherein the respective replica cardinalities indicate respective quantities of instances of the other software pods to run; and based on the editing the respective replica cardinalities to zero values, soft-stopping, by the containerized software application, all instances of the other software pods, wherein the containerized software application retains data stored within previously running instances of the other software pods that were soft-stopped based on the edited respective replica cardinalities.

16. The non-transitory computer-readable medium of claim 15, wherein the operations further comprise:

prior to the editing the respective replica cardinalities to zero values, verifying, by the controller software pod, that the first electronic notification is valid.

17. The non-transitory computer-readable medium of claim 15, wherein the operations further comprise:

accessing, by the controller software pod, a second electronic notification indicating that the maintenance of the system has been completed;

in response to the second electronic notification, editing, by the controller software pod, the respective replica cardinalities corresponding to all of the other software pods of the containerized software application to non-zero values; and based on the editing the respective replica cardinalities to non-zero values, soft-starting, by the containerized software application, one or more instances of the at least one of the other software pods using the retained data from the previously running instances of the other software pods that were soft-stopped.

18. The non-transitory computer-readable medium of claim 17, wherein the operations further comprise:

prior to the editing the respective replica cardinalities to non-zero values, verifying, by the controller software pod, that the second electronic notification is valid.

19. The non-transitory computer-readable medium of claim 15, wherein the containerized software application is a medical imaging program, and wherein the system comprises a medical imaging scanner.

20. The non-transitory computer-readable medium of claim 15, wherein the containerized software application is implemented via Kubernetes, and wherein the replica cardinalities are specified in a deployment or StatefulSet of the containerized software application.

* * * * *